(12) United States Patent
Choi et al.

(10) Patent No.: US 9,223,416 B2
(45) Date of Patent: *Dec. 29, 2015

(54) DISPLAY APPARATUS, REMOTE CONTROLLING APPARATUS AND CONTROL METHOD THEREOF

(71) Applicant: SAMSUNG ELECTRONICS CO., LTD., Suwon-si, Gyeonggi-do (KR)

(72) Inventors: Eun-seok Choi, Suwon-si (KR); Sang-on Choi, Suwon-si (KR); Jung-yeob Oh, Seongnam-si (KR); Suk-young Woo, Seoul (KR); Han-chul Jung, Seongnam-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/754,176

(22) Filed: Jan. 30, 2013

(65) Prior Publication Data

US 2013/0342454 A1 Dec. 26, 2013

(30) Foreign Application Priority Data

Jun. 20, 2012 (KR) .................. 10-2012-0066369
Oct. 29, 2012 (KR) .................. 10-2012-0120740

(51) Int. Cl.
G06F 3/01 (2006.01)
G06F 3/033 (2013.01)
(Continued)

(52) U.S. Cl.
CPC .............. *G06F 3/0346* (2013.01); *G06F 3/017* (2013.01); *G06F 3/038* (2013.01); *G06F 3/04815* (2013.01); *H04N 21/42222* (2013.01); *G06F 2203/0384* (2013.01)

(58) Field of Classification Search
CPC ........ G06F 3/0346; G06F 3/017; G06F 3/038

USPC ..................... 345/156–184; 178/18.01–20.04
See application file for complete search history.

(56) References Cited

U.S. PATENT DOCUMENTS 5,162,781 A * 11/1992 Cambridge ......... G06F 3/03544
345/158
5,655,093 A * 8/1997 Frid-Nielsen ....... G06F 3/04812
345/169

(Continued)

FOREIGN PATENT DOCUMENTS

EP 1335338 A2 8/2003
GB 2419433 A 4/2006

(Continued)

OTHER PUBLICATIONS

Office Action mailed Jul. 26, 2013 in corresponding U.S. Appl. No. 13/838,015.

(Continued)

*Primary Examiner* — Patrick F Marinelli
(74) *Attorney, Agent, or Firm* — Staas & Halsey LLP

(57) ABSTRACT

A remote controlling apparatus, a display apparatus and a controlling method are provided. The remote controlling apparatus for selecting one of a plurality of operating modes of an external device being operable between a pointing mode and a gesture mode, associated with the remote controlling apparatus, includes an output unit for outputting information regarding the remote controlling apparatus to the external device, a detection unit for detecting motion of the remote controlling apparatus, a motion information generating unit for generating motion information based on the detected motion of the remote controlling apparatus, an operation mode change unit for providing information regarding an operation mode, for changing the operation mode of the external device being operable between the pointing mode and the gesture mode, and wherein the information regarding the remote controlling apparatus comprise the information regarding the operating mode, and the motion information generated by the motion information generating unit.

17 Claims, 18 Drawing Sheets

(51) Int. Cl.
*H04N 21/422* (2011.01)
*G06F 3/0354* (2013.01)
*G06F 3/0346* (2013.01)
*G06F 3/0481* (2013.01)
*G06F 3/038* (2013.01)

(56) References Cited

U.S. PATENT DOCUMENTS

| | | | | |
|---|---|---|---|---|
| 5,777,618 A * | 7/1998 | Kita | G09G 5/346 | 345/418 |
| 5,781,195 A * | 7/1998 | Marvin | G06T 11/00 | 345/428 |
| 5,877,748 A * | 3/1999 | Redlich | G06F 3/011 | 345/159 |
| 7,030,856 B2 * | 4/2006 | Dawson | H04N 21/422 | 345/158 |
| 7,158,118 B2 * | 1/2007 | Liberty | G06F 3/017 | 345/156 |
| 7,173,604 B2 * | 2/2007 | Marvit et al. | G06F 3/017 | 345/156 |
| 7,721,231 B2 * | 5/2010 | Wilson | G06F 3/0346 | 345/156 |
| 7,905,782 B2 * | 3/2011 | Sawano | A63F 13/06 | 273/348 |
| 8,125,463 B2 * | 2/2012 | Hotelling | G06F 3/0416 | 178/18.01 |
| 8,144,123 B2 * | 3/2012 | Denoue | G06F 3/0304 | 345/156 |
| 8,487,969 B2 * | 7/2013 | Lim | G09G 3/3225 | 345/690 |
| 8,558,801 B2 * | 10/2013 | Yang | G06F 3/0488 | 345/173 |
| 8,624,838 B2 * | 1/2014 | Kusuda | G06F 1/1616 | 345/156 |
| 8,988,342 B2 * | 3/2015 | Choi | G06F 3/017 | 345/156 |
| 2005/0168488 A1 * | 8/2005 | Montague | G06F 3/04845 | 345/659 |
| 2005/0225534 A1 * | 10/2005 | Chang | G06F 9/4443 | 345/163 |
| 2006/0187155 A1 * | 8/2006 | Chang | G09G 3/3208 | 345/76 |
| 2006/0250358 A1 * | 11/2006 | Wroblewski | G06F 3/0346 | 345/157 |
| 2006/0274042 A1 * | 12/2006 | Krah | G06F 3/03543 | 345/163 |
| 2008/0001856 A1 * | 1/2008 | Cok | G09G 3/007 | 345/76 |
| 2008/0174551 A1 * | 7/2008 | Ishibashi | H04N 5/4403 | 345/158 |
| 2008/0297484 A1 * | 12/2008 | Park | G06F 3/04817 | 345/173 |
| 2009/0160809 A1 * | 6/2009 | Yang | G06F 3/04845 | 345/173 |
| 2009/0160813 A1 * | 6/2009 | Takashima | G06F 3/016 | 345/173 |
| 2010/0271400 A1 * | 10/2010 | Suzuki | G06F 3/017 | 345/660 |
| 2011/0231484 A1 * | 9/2011 | Burgess, III | G06F 3/0346 | 709/203 |
| 2012/0016641 A1 * | 1/2012 | Raffa | G06F 1/1694 | 703/2 |
| 2012/0105382 A1 * | 5/2012 | Tokuda | G06F 3/0304 | 345/178 |
| 2012/0124472 A1 * | 5/2012 | Pine et al. | G06F 3/038 | 715/707 |
| 2012/0154449 A1 * | 6/2012 | Ramagem | G06F 3/0346 | 345/684 |
| 2013/0063345 A1 * | 3/2013 | Maeda | G06F 3/017 | 345/156 |
| 2013/0082923 A1 * | 4/2013 | Lin | G06F 3/0308 | 345/157 |
| 2013/0342454 A1 * | 12/2013 | Choi | G06F 3/017 | 345/158 |
| 2013/0342455 A1 * | 12/2013 | Choi | G06F 3/017 | 345/158 |
| 2014/0040822 A1 * | 2/2014 | Yang | G06F 3/0488 | 715/800 |
| 2014/0195947 A1 * | 7/2014 | Yang | G06F 3/0486 | 715/769 |

FOREIGN PATENT DOCUMENTS

| | | |
|---|---|---|
| JP | 10-11608 | 1/1998 |
| JP | 2009-9612 | 1/2009 |
| JP | 2009-104449 | 5/2009 |
| JP | 2009-205609 | 9/2009 |
| JP | 2010-257037 | 11/2010 |
| JP | 2011-60166 | 3/2011 |
| KR | 10-2010-0129586 | 12/2010 |
| KR | 10-2011-0032365 | 3/2011 |
| KR | 10-2012-0027771 | 3/2012 |
| WO | 01/86920 A2 | 11/2001 |
| WO | WO 2006/119269 A2 | 11/2006 |
| WO | WO 2010/110573 A2 | 9/2010 |
| WO | WO 2012/057179 A1 | 5/2012 |

OTHER PUBLICATIONS

Korean Office Action issued Apr. 19, 2013 in corresponding Korean Patent Application No. 10-2012-0120740.
PCT International Search Report and Written Opinion issued May 30, 2013 in corresponding International Application No. PCT/KR2013/000851.
Extended European Search Report issued Jul. 2, 2013 in corresponding European Application No. 13153265.7.
Interview Summary with Advisory Action mailed Mar. 7, 2014 in related U.S. Appl. No. 13/838,015.
Final Office Action mailed Dec. 23, 2013 in related U.S. Appl. No. 13/838,015.
Office Action mailed Jul. 18, 2014 in related U.S. Appl. No. 13/838,015.
Japanese Office Action mailed Aug. 12, 2014 in related Japanese Application No. 2013-050046.
Notice of Allowance mailed Nov. 5, 2014 in related U.S. Appl. No. 13/838,015.
European Office Action mailed Jan. 21, 2015 in related European Application No. 13153265.7.
Japanese Office Action mailed Nov. 5, 2013 in related Japanese Application No. 2013-050046.
European Summons to Oral Proceedings mailed Sep. 23, 2015 in related European Application No. 13153265.7 (filed Jan. 30, 2013).

* cited by examiner

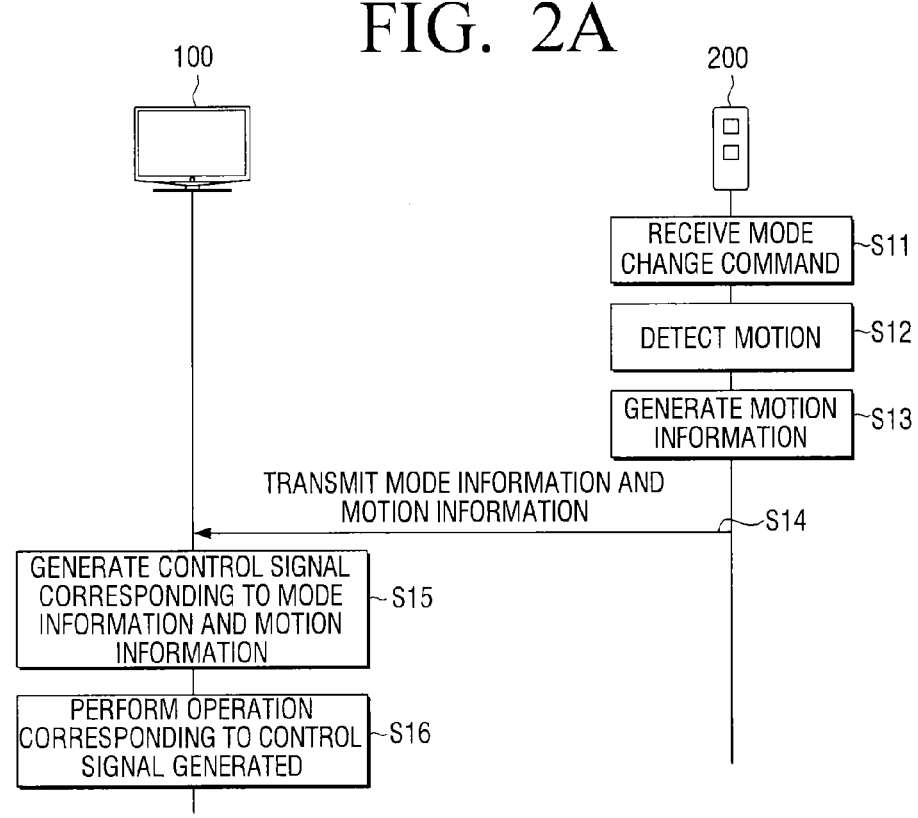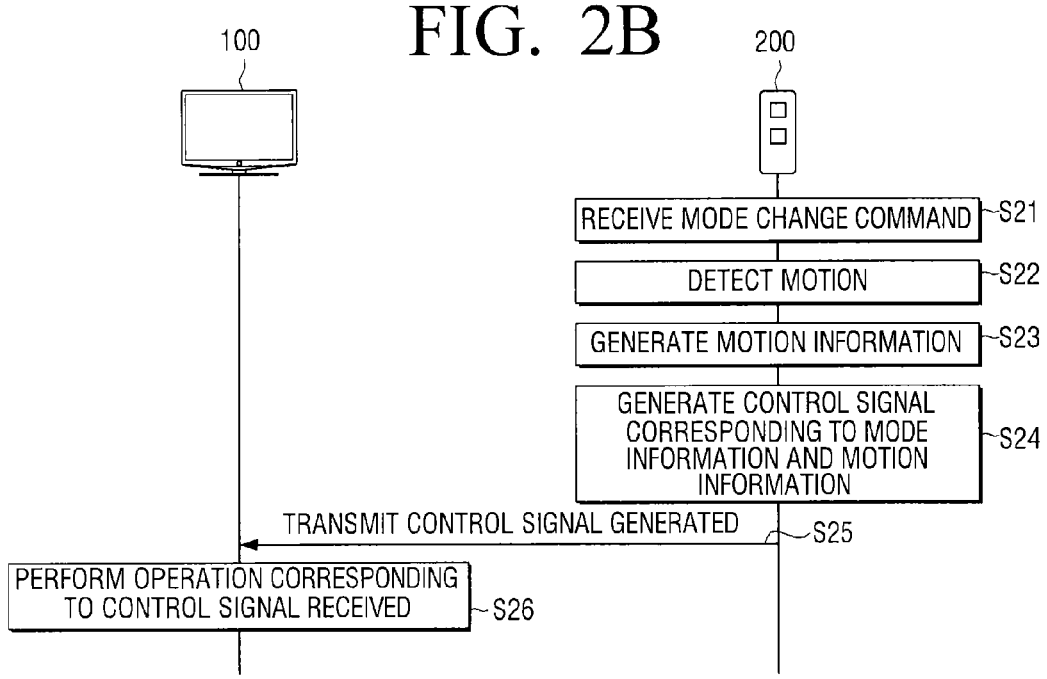

FIG. 11A  FIG. 11B
FIG. 11C
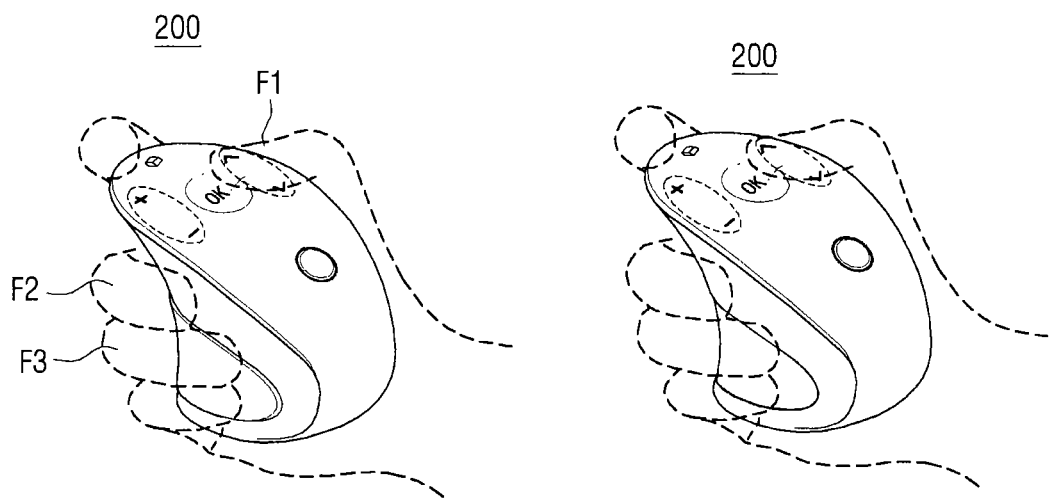
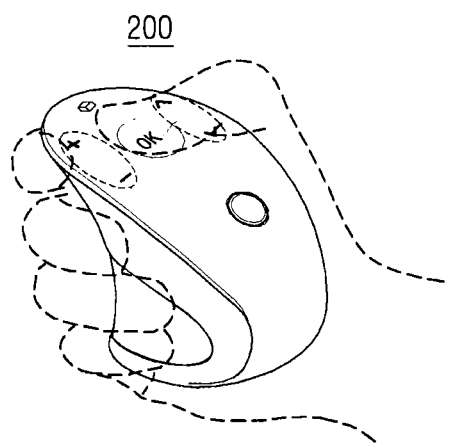

FIG. 12
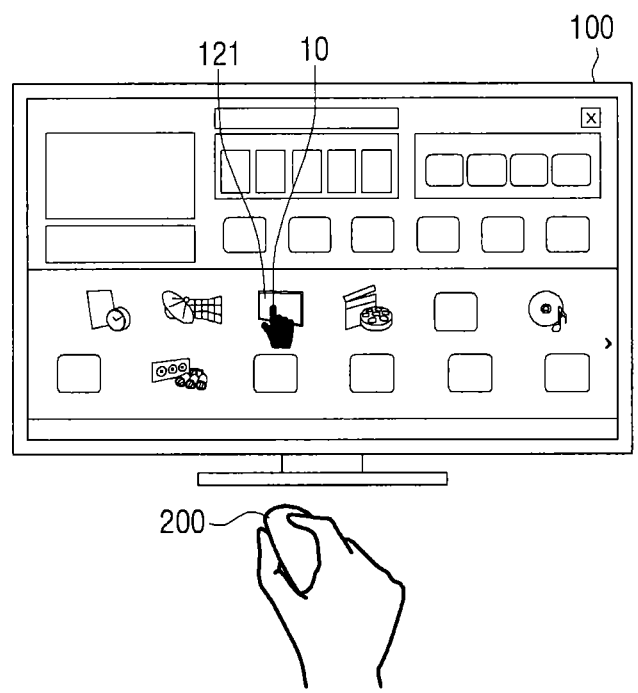
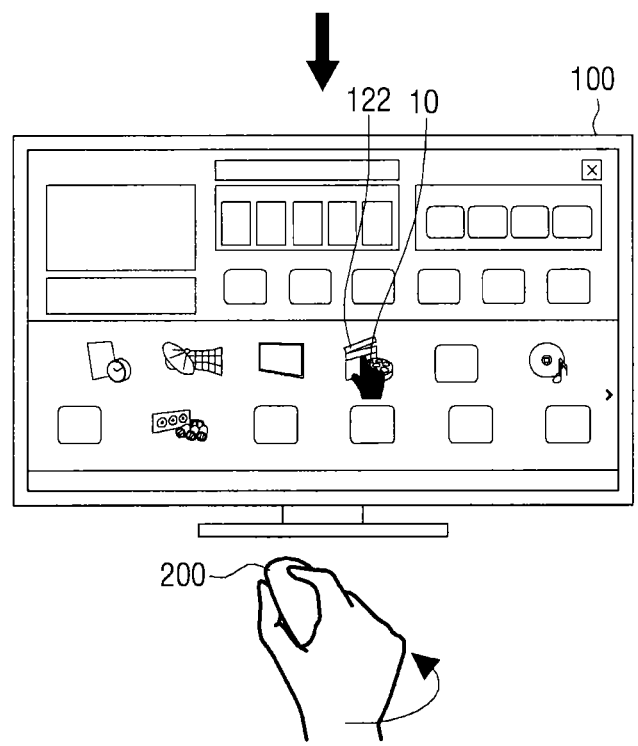

DISPLAY APPARATUS, REMOTE CONTROLLING APPARATUS AND CONTROL METHOD THEREOF

CROSS-REFERENCE TO RELATED APPLICATIONS

This application is related to, and claims priority to, Korean Patent Application No. 10-2012-0066369 filed on Jun. 20, 2012 and No. 10-2012-0120740 filed on Oct. 29, 2012 in the Korean Intellectual Property Office, the entire disclosures of which are incorporated herein by reference.

BACKGROUND

1. Field

Embodiments of the present disclosure relate to a remote controlling apparatus, a display apparatus, and control methods thereof. More particularly, the embodiments of the present disclosure relate to a remote controlling apparatus for detecting a motion, a display apparatus, and control methods thereof.

2. Description of the Related Art

As electronic technologies advance, methods for controlling an electronic device in various manners are under development. An electronic device may be controlled by using a button of the electronic device or a remote control that is a separate device from the electronic device.

However, when the electronic device is controlled using a remote control that is separate from the electronic device, a user needs to identify and press buttons of the remote control one-by-one for their intended manipulation.

For example, using a pointer displayed on a screen to select a particular content on the electronic device screen, the user can select the particular content by moving the pointer to a corresponding content region by alternately selecting four direction buttons of the remote control several times, and then pressing a selection button of the remote control in the corresponding content region. That is, the user can select the corresponding content by identifying the buttons of the remote control multiple times and pressing the buttons multiple times.

Hence, what is needed is a method for a user to more easily discover information displayed on the screen of the electronic device from distance.

SUMMARY

Additional aspects and/or advantages will be set forth in part in the description which follows and, in part, will be apparent from the description, or may be learned by practice of the invention.

The present invention addresses the above-mentioned and other problems and disadvantages occurring in the conventional arrangement, among others. An aspect of the present invention provides a remote controlling apparatus for intuitively controlling a user interface screen (a UI screen) provided from each mode of a display apparatus being operable in a plurality of operating modes, the display apparatus, and control methods thereof.

According to an aspect of the present invention, a remote controlling apparatus for providing remote control signals for an external display apparatus having a plurality of operation modes includes a pointing mode and a gesture mode, and includes a signal output unit for outputting the remote control signals to the external display apparatus that provides a user interface screen, a detection unit for detecting motion of the remote controlling apparatus, an input unit comprising a first button unit and a second button unit, the first button unit being used for receiving a user command for selecting one of the pointing mode and the gesture mode in the operation mode of the external display apparatus, and the second button unit being used for receiving a user command for selecting an pointing object displayed in the user interface screen, and a control unit for controlling the signal output unit to output information regarding the detected motion and information regarding the user command for selecting one of the pointing mode and the gesture mode, when the user command via the first button unit is input, and the pointing mode is a mode for controlling movement of the pointing object displayed on the user interface screen according to the motion of the remote controlling apparatus detected by the detection unit, and the gesture mode is a mode for controlling display state of the user interface screen according to a predefined gesture of the remote controlling apparatus.

During a time interval in which the information regarding the user command for selecting one of the pointing mode and the gesture mode is not received from the remote controlling apparatus, the external display apparatus may remain in the pointing mode as a default mode, and during a time interval in which the information regarding the user command for selecting one of the pointing mode and the gesture mode is continuously received from the remote controlling apparatus, the external display apparatus may transition to and remain in the gesture mode as a non-default mode.

The control unit may control the signal output unit to output the information regarding the user command for selecting one of the pointing mode and the gesture mode continuously while the first button unit is being pressed, and not to output the information regarding the user command for selecting one of the pointing mode and the gesture mode when the pressed first button unit is released The detection unit may include at least one of an accelerometer, an angular velocity sensor, and a magnetometer.

A display apparatus having a plurality of operation modes comprising a pointing mode and a gesture mode, controlled by a remote controlling apparatus that provides remote control signals, includes a receiving unit for receiving the remote control signals comprising information regarding a motion of the remote controlling apparatus, information regarding a user command for selecting one of the pointing mode and the gesture mode, and information regarding an item selection from the remote controlling apparatus, a display unit for displaying a user interface screen having a pointing object which performs an indicating function on the user interface screen, and a control unit for controlling to select one of the pointing mode and the gesture mode based on the information regarding the user command for selecting one of the pointing mode and the gesture mode received from the remote controlling apparatus, and the pointing mode is a mode for controlling movement of the pointing object displayed on the user interface screen according to the motion of the remote controlling apparatus detected by the detection unit, and the gesture mode is a mode for controlling display state of the user interface screen according to a predefined gesture of the remote controlling apparatus.

The display unit may display the pointing object of which a shape is changed according to the operation mode.

The control unit may determine the operation mode of the display apparatus as the pointing mode while the receiving unit does not receive the information regarding the user command for selecting one of the pointing mode and the gesture mode, and the control unit may determine the operation mode of the display apparatus as the gesture mode while the receiving unit receives the information regarding the user command for selecting one of the pointing mode and the gesture mode.

When the operation mode of the display apparatus is the pointing mode, a menu item included the user interface screen may be selected based on the information regarding a motion of the remote controlling apparatus and the information regarding an item selection received from the remote controlling apparatus.

The control unit may control to display the pointing object by changing at least one of a shape, a color, a size, a location, and a direction according to an input manipulation state on the user interface screen.

The pointing object may be a hand-shaped pointer, and the control unit may control a display of the hand-shaped pointer by changing into a pointing type, a palm type, or a grip type based on a possible manipulation of flicking, zoom in/out, and panning, on the user interface screen.

A display system comprising a remote controlling apparatus that provides remote control signals and a display apparatus having a plurality of operation modes comprising a pointing mode and a gesture mode, controlled by the remote controlling apparatus, includes the remote controlling apparatus for outputting the remote control signals comprising information regarding a motion of the remote controlling apparatus, information regarding a user command for selecting one of the pointing mode and the gesture mode, and information regarding an item selection, and the display apparatus includes a receiving unit for receiving the remote control signals comprising information regarding a motion of the remote controlling apparatus, information regarding a user command for selecting one of the pointing mode and the gesture mode, and information regarding an item selection from the remote controlling apparatus, a display unit for displaying a user interface screen having a pointing object which performs an indicating function on the user interface screen, and a control unit for controlling to select one of the pointing mode and the gesture mode based on the information regarding the user command for selecting one of the pointing mode and the gesture mode received from the remote controlling apparatus, and the pointing mode is a mode for controlling movement of the pointing object displayed on the user interface screen according to the motion of the remote controlling apparatus detected by the detection unit, and the gesture mode is a mode for controlling display state of the user interface screen according to a predefined gesture of the remote controlling apparatus.

During a time interval in which information regarding the user command for selecting one of the pointing mode and the gesture mode is not received from the remote controlling apparatus, the display apparatus may be configured to remain in a pointing mode as a default mode. During a time interval in which the information regarding the user command for selecting one of the pointing mode and the gesture mode is continuously received from the remote controlling apparatus, the display apparatus may be configured to transition and remain in a gesture mode as a non-default mode.

A remote control apparatus may include a signal output unit for outputting the remote control signals to the display apparatus, an input unit having a first button for receiving the user command for selecting one of the pointing mode and the gesture mode, and a control unit configured to control the signal output unit to output the information regarding the user command for selecting one of the pointing mode and the gesture mode continuously while the first button unit is being pressed, and not to output the information regarding the user command for selecting one of the pointing mode and the gesture mode when the pressed first button unit is released.

A control method of a remote controlling apparatus for providing remote control signals for an external display apparatus having a plurality operation modes comprising a pointing mode and a gesture mode includes detecting motion of the remote controlling apparatus and outputting information regarding the detected motion and information regarding a user command for selecting one of the pointing mode and the gesture mode, when the user command for selecting one of the pointing mode and the gesture mode in the operation mode of the external display apparatus is input, and the pointing mode is a mode for controlling movement of a pointing object displayed on the user interface screen according to the motion of the remote controlling apparatus, and the gesture mode is a mode for controlling display state of the user interface screen according to a predefined gesture of the remote controlling apparatus.

A control method of a display apparatus having a plurality of operation modes comprising a pointing mode and a gesture mode, controlled by a remote controlling apparatus which provides remote control signals includes displaying a user interface screen having a pointing object for performing an indicating function, receiving the remote control signals comprising information regarding a motion of the remote controlling apparatus and information regarding a user command for selecting one of the pointing mode and the gesture mode from the remote controlling apparatus, and selecting one of the pointing mode and the gesture mode based on the information regarding the user command for selecting one of the pointing mode and the gesture mode received from the remote controlling apparatus.

In a pointing mode for controlling movement of a pointer displayed on a user interface screen provided by the display apparatus according to motion of the remote controlling apparatus, if the user command is input, the remote controlling apparatus may be switched to a gesture mode for controlling a display state of the user interface screen according to a predefined gesture of the remote controlling apparatus.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIGS. 2A-2B illustrate exemplary operations of a display system according to an embodiment of the present invention;

FIGS. 11A, 11B, and 11C illustrate manipulation of the remote controlling apparatus according to various embodiments of the present invention;

FIG. 12 illustrates operations in a pointing mode according to an embodiment of the present invention;

DETAILED DESCRIPTION

Figure 1:
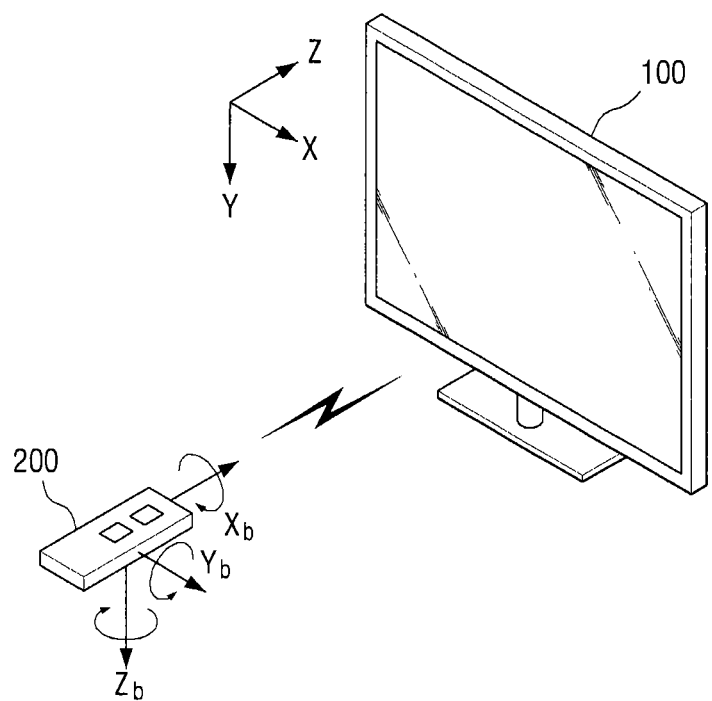
FIG. 1 illustrates a display system according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates a display system according to an embodiment of the present invention.

As illustrated in FIG. 1, the display system according to an embodiment of the present invention includes a display apparatus 100 and a remote controlling apparatus 200.

The display apparatus 100 may be controlled by the remote controlling apparatus 200. While the display apparatus 100 can be implemented using, but not limited to, a digital TV, it can employ any device allowing the remote controlling such as a PC.

The remote controlling apparatus 200 remotely controls the display apparatus 100. The remote controlling apparatus 200 can receive a user command and send a signal corresponding to the input user command to the display apparatus 100.

The remote controlling apparatus 200 can detect a motion of the remote controlling apparatus 200 in a XYZ space and send a signal of the detected 3D motion to the display apparatus 100. The 3D motion can correspond to a command for controlling the display apparatus 100. That is, a user can send a command to the display apparatus 100 by moving the remote controlling apparatus 200 in the space.

The remote controlling apparatus 200 may send motion information itself corresponding to the detected motion (a first exemplary embodiment), or may convert motion information corresponding to the detected motion into a control signal for controlling the display apparatus 100 and send the control signal (a second exemplary embodiment). An operation for controlling the control signal from the detected motion information may be performed by the display apparatus 100 or the remote controlling apparatus 200.

The display apparatus 100 can provide a plurality of different operating modes.

The display apparatus 100 can operate in a pointing mode for controlling movement of a pointing object displayed in a user interface screen (hereafter, referred to as a UI screen) provided through the display apparatus 100 according to the motion of the remote controlling apparatus 200, and in a gesture mode for controlling the display state of the UI screen according to a predefined gesture of the remote controlling apparatus 200. The change of the display state of the UI screen controlled in the gesture mode may change the screen display state according to a preset event, such as screen change executing a particular function such as menu screen display or a screen change such as page change for changing contents displayed in the screen. The gesture mode can be differentiated from the pointing mode which merely controls the movement of the pointing object.

The pointing mode may be provided based on an absolute coordinate scheme in which motion region of the remote controlling apparatus 200 and the screen of the display apparatus 100 are matched.

The motion region of the remote controlling apparatus 200 corresponding to the whole screen region of the display apparatus 100 can be preset. For example, the motion region between left-handed rotation 30° and right-handed rotation 30° in a preset reference state can correspond to the whole display screen. A preset reference state can be set by a user command. For example, when the remote controlling apparatus 200 is turned on and the user command for setting the reference state (e.g., a centering button (not illustrated) of the remote controlling apparatus 200) is input, the current state of the remote controlling apparatus 200 can be set to the reference state and the pointing object corresponding to the current state of the remote controlling apparatus 200 can be displayed at a preset position (e.g., in the center of the screen) in the preset region of the screen of the display apparatus 100.

A coordinate value of the pointing object corresponding to the rotation state of the remote controlling apparatus 200 moved by the user can be calculated based on a preset reference pint. For example, X and Y coordinate values corresponding to the rotation state of the remote controlling apparatus 200 moved by the user can be calculated using the center of the display screen as the absolute reference point.

For example, when the remote controlling apparatus 200 rotates 10 degrees to the right in the space, the pointing object corresponding to the rotation state of the remote controlling apparatus 200 can move from the matching point (x1, y1) (e.g., the center pointer) to (x2, y2).

A relative coordinate scheme may be applied, which is well known in the art and its detailed description is omitted.

The remote controlling apparatus 200 can include a mode change button for receiving the user command to change the operation mode of the display apparatus 100. When the mode change button is being pressed, the changed mode can be maintained.

The display apparatus 100 and the remote controlling apparatus 200 can communicate using various communication schemes such as BlueTooth (BT), Zigbee, Wireless Fidelity (Wi-Fi), Infrared (IR), Serial Interface, and Universal Serial Bus (USB). For example, when the display apparatus 100 and the remote controlling apparatus 200 communicate using the BT, they can interwork through BT pairing. A BT pairing is well-known to those skilled in the art and its detailed explanations is omitted.

Operations of an exemplary embodiment are disclosed.

A First Exemplary Embodiment

FIG. 2A illustrates of operations of a display system according to the first exemplary embodiment of the present invention.

As illustrated in FIG. 2A, a mode change command may be received from the remote controlling apparatus 200 (S11). For example, if the display apparatus 100 operates in the pointing mode, the display apparatus 100 may receive a mode change command to change the pointing mode into the gesture mode, or if the display apparatus 100 operates in the gesture mode, the display apparatus 100 may receive a mode change command to change the gesture mode into the pointing mode. The display apparatus 100 can provide the UI screen including the pointing object. In the pointing mode, the pointing object displayed in the UI screen can point at least one content, and the pointer can move on the UI screen according to the rotation direction and the rotation degree of the remote controlling apparatus 200. For example, when the pointing object is in a hand shape, a hand-shaped pointing type pointer can be used. When the absolute coordinate scheme is used in the pointing mode, the display position of the pointing object displayed in the screen can be moved.

In the gesture mode, the display apparatus 100 can change and display the hand-shaped pointing type pointer to a palm-type hand pointer.

The display apparatus 100 can display a guide GUI for guiding the gesture input together with the palm-type hand pointer on the screen. The guide GUI can be in a different shape according to the type of the UI screen. For example, the guide GUI can use an arrow for guiding the gesture direction applicable to the current UI screen.

If the remote controlling apparatus 200 detects a motion (S12), the remote controlling apparatus 200 generates motion information corresponding to the detected motion (S13). For example, the remote controlling apparatus 200 may generate motion information corresponding to "rotation of a 5° angle to the right".

The remote controlling apparatus 200 transmits to the display apparatus 100 information regarding the operation mode of the display apparatus 100 according to the mode change command received in operation of S11 and the motion information generated in operation of S13 (S14). The information regarding the operation mode may be information indicating the pointing mode or the gesture mode.

The display apparatus 100 generates a control signal for controlling operation of the display apparatus 100 based on the received information regarding the operation mode and the received motion information (S15).

if the received mode information indicates the pointing mode, the received motion information may be converted and generated into a control signal corresponding to the pointing mode, or if the received mode information indicates the gesture mode, the received motion information may be converted and generated into a control signal corresponding to the gesture mode. For example, if the received information regarding the operation mode indicates the pointing mode and if the received motion information indicates "rotation of a 10° angle to the right", a control signal may be generated to move the pointing object displayed on the screen to corresponding coordinates, if the received mode information indicates the gesture mode, if the received motion information indicates "rotation of a 10° angle to the right", and if a gesture corresponding to the motion information is mapped to a screen change command, a control signal may be generated to change a UI screen page displayed on the screen to a subsequent UI screen page.

The display apparatus 100 performs operation corresponding to the generated control signal (S16).

FIG. 2B illustrates exemplary operations of a display system of according to a second exemplary embodiment of the present invention.

Operations of S21-S23 illustrated in FIG. 2B are similar to corresponding operations of FIG. 2A, so detailed description is not repeated.

The remote controlling apparatus 200 generates a control signal based on the mode information included in the mode change command received in operation of S21 and the motion information generated in operation of S23 (S24). That is, if the received mode information indicates the pointing mode, the received motion information may be converted and generated into a control signal corresponding to the pointing mode, or if the received mode information indicates the gesture mode, the received motion information may be converted and generated into a control signal corresponding to the gesture mode. Accordingly, the remote controlling apparatus 200 may be implemented with an arithmetic operation function for generating a control signal based on the received mode information and motion information.

The remote controlling apparatus 200 transmits the generated control signal to the display apparatus 100 (S25).

The display apparatus 100 performs operation corresponding to the received control signal (S26). That is, the display apparatus 100 may perform its operation without an arithmetic operation unlike the exemplary embodiment illustrated in FIG. 2A.

For example, if the display apparatus 100 receives a control signal corresponding to a motion which changes a currently displayed UI page to a subsequent UI page, the display apparatus 100 performs the operation corresponding to the received control signal.

Figure 3A:
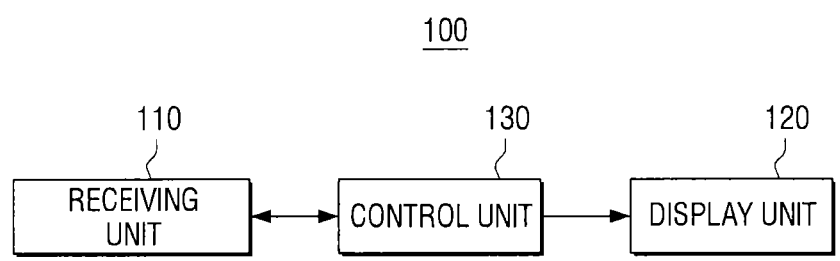
FIGS. 3A-3B illustrate a display apparatus according to an embodiment of the present invention.
Figure 3B:
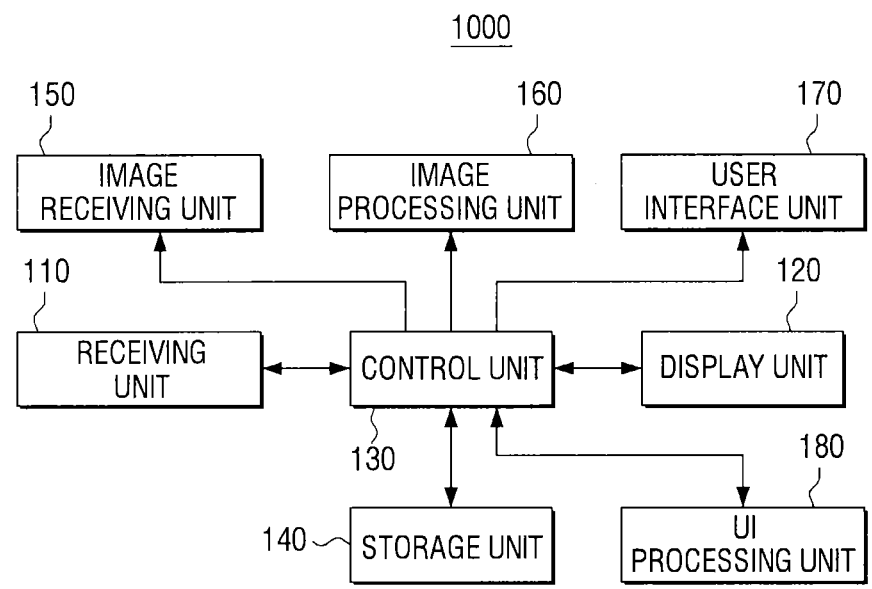

FIGS. 3A-3B illustrate a display apparatus according to an embodiment of the present invention.

Referring to FIG. 3A, the display apparatus 100 may include a receiver 110, a display unit 120, and a control unit 130. An exemplary operation of the display apparatus 100 is disclosed according to a first and second exemplary embodiments.

[An Operation of the Display Apparatus According to the First Exemplary Embodiment]

While the display apparatus 100 can be implemented using, but not limited to, a digital TV, a PC, or a notebook, it can employ any device having the display function and allowing the remote controlling.

The receiver 110 can communicate with the remote controlling apparatus 200. The receiver 110 can communicate with the remote controlling apparatus 200 using the various communication schemes such as BT, Zigbee, Wi-Fi, IR, Serial Interface, and USB.

The communication unit 110 can receive information regarding an operation mode of mode of the display apparatus 100 and a remote control signal including motion information of the remote controlling apparatus 200 from the remote controlling apparatus 200. The information regarding the operation mode of the display apparatus 100 may be information regarding a user command to select one of a pointing mode or a gesture mode, and may be implemented in diverse forms. For example, the mode information may be implemented in a flag form. In the case of the pointing mode, the flag may indicate "0", or in the case of the gesture mode, the flag may indicate "1". That is, the remote controlling apparatus 200 may generate flag information indicating "0" or "1" according to the user's command to change the mode. The user command for mode selection may be input through a first button unit (not illustrated) formed on the remote controlling apparatus 200.

The information regarding the operation mode may not only be transmitted to the display apparatus 100 whenever the motion information is transmitted, but may also be transmitted only when there is a mode change command. In the latter case, the display apparatus 100 recognizes motion information that is received until information regarding a changed operation mode is retransmitted after information regarding the operation mode is transmitted, as motion information for the same operating mode.

The receiver 110 may receive information regarding item selection from the remote controlling apparatus 200. For example, the receiver 110 may receive a selection signal to select an item where the pointing object is located in the pointing mode, and the selection signal may be input through a second button unit (not illustrated) of the remote controlling apparatus 200.

The receiver 110 may be configured to perform a transmission function to transmit information to the remote controlling apparatus 200. For example, when the display apparatus 100 is turned off, the remote controlling apparatus 200 can be automatically turned off by sending a power-off signal to the remote controlling apparatus 200.

The display unit 120 can provide various display screens through the display apparatus 100.

The display unit 120 can display a UI screen having a pointing object which performs an indicating function.

The display unit 120 can display the GUI corresponding to the operation mode of the display apparatus 100 under control of the control unit 130.

In the pointing mode, the display unit 120 can display the pointing object such as cursor, mouse cursor, or highlight display on the displayed UI screen. In the pointing mode, the display unit 120 can move and display the position of the pointing object according to motion information received from the remote controlling apparatus 200.

The display unit 120 may display the pointing object of which shape is changed according to operation modes.

When the display apparatus 100 is switched from the pointing mode to the gesture mode, the display unit 120 can display the guide GUI for guiding the gesture input on the displayed UI screen. The guide GUI can be, but not limited to, an arrow-shaped cue indicating the gesture direction.

The display unit 120 can be implemented using various displays such as liquid crystal display, thin film transistor-liquid crystal display, organic light-emitting diode, flexible display, and 3D display.

The control unit 130 controls the operations of the display apparatus 100.

The control unit 130 can control selection of an operation mode based on the information regarding the operation mode received from the remote controlling apparatus 200.

The control unit 130 can control selection of one of a pointing mode and a gesture mode based on information regarding a user command to select one of the pointing mode and the gesture mode.

A control unit 130 can determine the operation mode of the display apparatus 100 as the pointing mode while information regarding a user command to select one of the pointing mode and the gesture mode is not received, and can determine the operation mode of the display apparatus 100 as the gesture mode while information regarding a user command to select one of the pointing mode and the gesture mode is received.

The controller 130 can convert motion information received from the remote controlling apparatus 200 into a control signal to control the display apparatus 100 and control the operation of the display apparatus 100 according to the converted control signal.

The control unit 130 can convert the received motion information into a control signal applied to the function of the display apparatus 100 using a control signal mapping table, and control the functions of the display apparatus 100 using the converted control signal.

The control unit 130 may control the display unit 120 to provide the GUI of the corresponding type according to the operation mode of the display apparatus 100.

For example, when the UI screen is displayed in the display unit 120, the display apparatus 100 can operate in the pointing mode and display the corresponding GUI. When the display apparatus 100 operates in the gesture mode according to the received information, the display unit 120 can be controlled to display the corresponding GUI. The GUI is a pointing object for various indicating functions on the UI screen and can employ the pointer, the cursor, or the mouse cursor as mentioned above.

If the operation mode of the display apparatus 100 is the pointing mode, a menu item included in the UI screen can be selected based on information regarding the motion of the remote controlling apparatus 200 and information regarding item selection received from the remote controlling apparatus 100.

When the display apparatus 100 receives mode information corresponding to the gesture mode from the remote controlling apparatus 200, the control unit 130 can display the type of the pointing object displayed on the screen. For example, when the pointing object is the hand-shaped pointer, the hand pointing shape with only the forefinger spread can be displayed in the pointing mode and the palm-type hand with all five fingers spread can be displayed in the gesture mode.

The control unit 130 can change and display at least one of the shape, the color, the size, the position, and the direction of the pointing object according to the input manipulation on the UI screen displayed in the gesture mode. For example, when the pointing object is the hand-shaped pointer and the screen zoom in/out operation is available in the gesture mode, the hand-shaped pointer can be enlarged in the zoom-in state and reduced in the zoom-out state.

In the gesture mode, the control unit 130 can control the display unit 120 to display a guide GUI having the direction guiding the gesture input through the remote controlling apparatus 200. For example, when left and right flicking operations are possible in the gesture mode, the guide GUI of the left and right arrow directions can be displayed.

The control unit 130 can control the display unit 120 to change and display at least one of the movement direction and the movement degree of the pointing object displayed on the UI screen according to at least one of the rotation direction and the rotation degree of the remote controlling apparatus 200 in the pointing mode. An absolute coordinate scheme can be used.

When the gesture for rotating the remote controlling apparatus 200 on the XY axes in parallel with the screen of the display unit 120 is input in the gesture mode, the control unit 130 can control the display unit 120 to change and display the UI screen to other UI screen systematically matched to the XY-axis directions.

When the gesture for rotating the remote controlling apparatus 200 on the Z axis which is vertical to the screen of the display unit 120 is input in the gesture mode, the control unit 130 can control to zoom in or out the selected content on the UI screen according to the rotation of the remote controlling apparatus 200.

[An Exemplary Operation of the Display Apparatus According to a Second Exemplary Embodiment]

In the operation of the display apparatus according to a second exemplary embodiment, detailed description of components that are similar to those of the display apparatus according to the first exemplary embodiment are not repeated.

The communication unit 110 may communicate with the remote controlling apparatus 200. The communication unit 110 may communicate with the remote controlling apparatus 200 using the various communication schemes such as BT, Zigbee, Wi-Fi, IR, Serial Interface, and USB.

The communication unit 110 may receive a control signal generated based on mode information input by the remote controlling apparatus 200 and motion information of the remote controlling apparatus 200. That is, unlike the first exemplary embodiment, the receiver 110 may receive from the remote controlling apparatus 200 a control signal of a form capable of controlling the display apparatus 100 without a separate arithmetic operation.

The display unit 120 may provide diverse display screens that can be provided by the display apparatus 100. Since content displayed by the display unit 120 is similar as that of the first exemplary embodiment, detailed description is not repeated.

The control unit 130 may control the operation of the display apparatus 100 based on a control signal received from the remote controlling apparatus 200. The control unit 130 may control the movement of the pointing object according to a received control signal in the pointing mode, and may change screen according to a received control signal in the gesture mode. Since the control of the display unit 120 by the control unit 130 has been described in the first exemplary embodiment, detailed description is not repeated.

FIG. 3B illustrates of an exemplary display apparatus.

Components of the display apparatus according to a first exemplary embodiment are explained for convenience of description. Since the display apparatus according to a second exemplary embodiment operates according to a control signal transmitted from the remote controlling apparatus, detailed description is not repeated.

Referring to FIG. 3B, a display apparatus 1000 includes the communication unit 110, the display unit 120, the control unit 130, a storage unit 140, an image receiving unit 150, an image processing unit 160, a user interface unit 170, and a UI processing unit 180. In FIG. 3B, the display apparatus 100 of FIG. 3A may be implemented using the digital TV. A description of components in FIG. 3B that are similar to the components of FIG. 3A are omitted.

The storage unit 140 is a storage medium storing various data and programs for operating the display apparatus 1000, and can be implemented using a memory or a Hard Disk Drive (HDD).

The storage unit 140 can store the control information corresponding to the motion information received from the remote controlling apparatus 200 in the gesture mode. The storage unit 140 can store the control signal corresponding to the motion information received from the remote controlling apparatus 200 in the gesture mode, in a table form. For example, a control signal corresponding to the UI screen change command can be matched and stored when the motion information corresponding to the gesture (e.g., the left and right rotation of the remote controlling apparatus 200) flicked from the left to the right is received from the remote controlling apparatus 200. A control signal corresponding to the content zoom in/out command can be matched and stored when the motion information corresponding to the forward and backward movement gesture (e.g., the forward and backward rotation of the remote controlling apparatus 200) is received from the remote controlling apparatus 200.

The image receiving unit 150 receives the broadcasting content over an antenna or a cable, or receives the image content from an external device or an external communication network.

The image receiving unit 150 can receive various image contents over a network or over the air. The contents can be various contents such as the produced contents such as VOD content or broadcasting contents.

The image receiving unit 150 can be received in various types. For example, when the display apparatus 100 is implemented using the digital TV, the image receiving unit 150 can be implemented using a set-top box, a tuner, an external input port, and/or a network communication module.

The image processing unit 160 processes various signals received through the image receiving unit 150. An image processing unit 160 can include signal processing components such as demodulator, decoder, A/D converter, and scaler.

The user interface unit 170 receives various user signals.

The user interface unit 170 can be implemented in various fashions according to the type of the display apparatus 100. For example, when the display apparatus 100 is implemented using the digital TV, the user interface unit 170 may be realized as the communication unit 110 for receiving the remote control signal.

The user interface unit 170 may be implemented using an input panel including a plurality of keys, or a touch screen of a layer structure including a display and a touch pad.

The UI processing unit 180 generates various UI elements superimposed on the image output on the display unit 120 under the control of the control unit 130. The UI processing unit (not illustrated) can generate 2D or 3D UI elements.

The UI processing unit 180 can process 2D/3D conversion, transparency, color, size, shape and location adjustment, highlight, and animation effect of the UI element under the control of the control unit 130.

Figure 4:
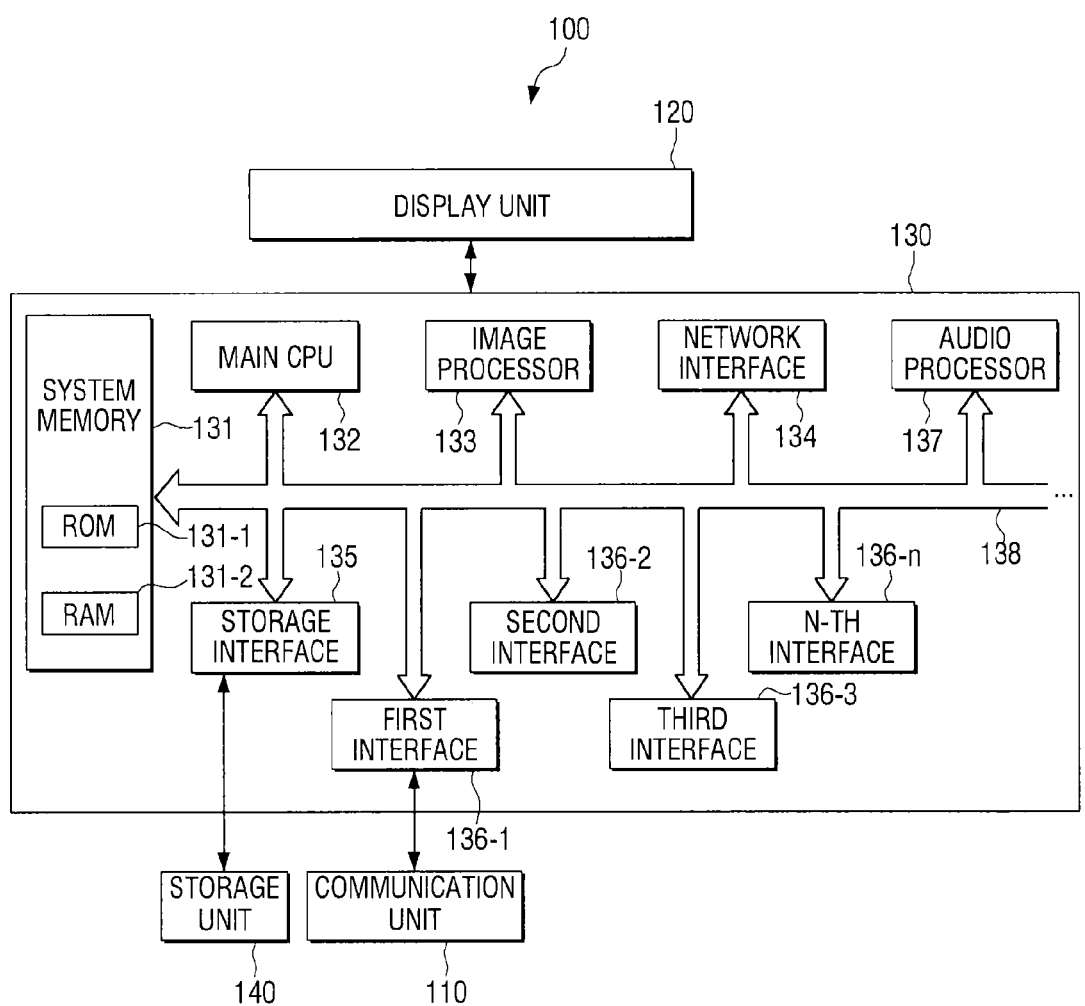
FIG. 4 illustrates an exemplary control unit according to an embodiment of the present invention.

FIG. 4 illustrates a control unit 130 according to an embodiment of the present invention.

Referring to FIG. 4, the control unit 130 includes a system memory 131, a main CPU 132, an image processor 133, a network interface 134, a storage interface 135, first through n-th interfaces 136-1 through 136-n, an audio processor 137, and a system bus 138.

The system memory 131, the main CPU 132, the image processor 133, the network interface 134, the storage interface 135, the first through n-th interfaces 136-1 through 136-n, and the audio processor 137 are interconnected through the system bus 138 to transmit and receive various data and signals.

The first through n-th interfaces 136-1 through 136-n support the interfacing between the various components including the display unit 120 and the components of the control unit 130. At least one of the first through n-th interfaces 136-1 through 136-n may be implemented using a button of the main body of the display apparatus 100, or an input interface for receiving various signals from an external device connected via first through n-th external input ports.

The system memory 151 includes a ROM 131-1 and a RAM 131-2. The ROM 131-1 stores an instruction set for booting up the system. When a turn-on instruction is input and the power is supplied, the main CPU 132 copies Operating System (O/S) stored to the storage unit 140 to the RAM 131-2 and boots up the system by executing the O/S according to the instruction stored to the ROM 131-1. When the booting is completed, the main CPU 132 copies various application programs stored to the storage unit 140 to the RAM 131-2, and executes various operations by running the application programs copied to the RAM 131-2.

The main CPU 132 can perform various operations according to the execution of the application programs stored to the storage unit 140.

The storage interface 135 may be connected to the storage unit 140, and transmits and receives various programs, contents, and data.

For example, when the control signal is received from the remote controlling apparatus 200, the main CPU 132 can read the control information mapped to the control signal by accessing the storage unit 140 via the storage interface 135, and then control the display apparatus 100 using the read control information.

The image processor 133 can include a decoder, a renderer, a scaler, for example. The image processor 133 decodes the stored content, constructs a frame by rendering the decoded content data, and scales the size of the constructed frame in accordance with the screen size of the display unit 120. The image processor 133 provides the processed frame to the display unit 120 to display the frame.

The audio processor 137 processes and provides audio data to a device that produces a sound output such as speaker (not illustrated). The audio processor 137 can decode the audio data stored to the storage unit 140 or the audio data received from the outside, filter noise, and then process the audio signal, for example, amplify the audio to an adequate decibel. For example, when the played content is a video content, the audio processor 137 can process audio data demultiplexed from the video content and provide the processed audio data to the speaker (not illustrated) to output the audio in synchronization with the image processor 133.

The network interface 134 may be connected to external devices over a network. For example, when the application for providing information provision service is driven, the main CPU 132 can communicate with the remote controlling apparatus 200 via the network interface 134.

Operations of the control unit 130 can be executed by running various programs stored to the storage unit 140.

Figure 5:
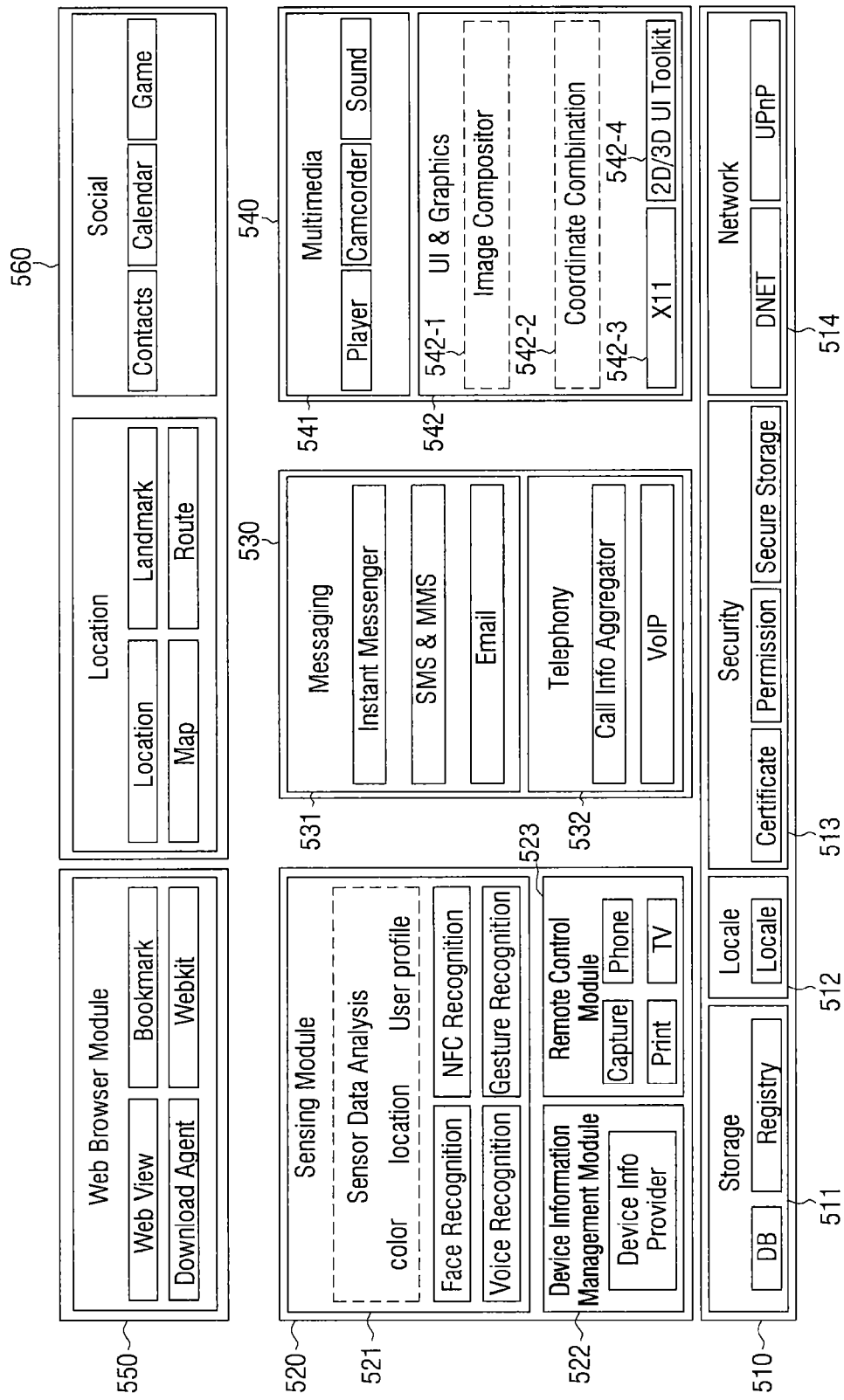
FIG. 5 illustrates software architecture of an exemplary storage unit for supporting operations of a control unit according to an embodiment of the present invention.

FIG. 5 illustrates exemplary software architecture of the storage unit 140 for supporting the operations of the control unit 130 according to various embodiments of the present invention. Referring to FIG. 5, the storage unit 140 includes a base module 510, a device management module 520, a communication module 530, a presentation module 540, a web browser module 550, and a service module 560.

The base module 510 is a base module for processing signals received from the hardware of the display apparatus 100 and sending the processed signals to a higher layer module.

The base module 510 includes a storage module 511, a location based module 512, a security module 513, and a network module 514.

The storage module 511 is a program module for managing database (DB) or registry The location based module 512 is a program module for supporting a location based service in association with hardware such as GPS chip. The security module 513 is a program module for supporting hardware certification, permission, and secure storage. The network module 514 supports the network connection and includes a DNET module and an UPnP module. For example, the network module 514 can access an external server (not illustrated) over the network.

The device management module 520 manages and utilizes information of the external input and the external device. The device management module 520 can include a sensing module 521, a device information management module 522, and a remote control module 523. For example, information of the remote controlling apparatus 200 can be managed through the device management module 520.

The sensing module 521 analyzes various sensor data. For example, the sensing module 521 can include a face recognition module, a voice recognition module, a motion recognition module, and an NFC recognition module.

The device information management module 522 provides information about various devices, and the remote control module 523 is a program module for remotely controlling peripheral devices such as phone, printer, camera, and air conditioner.

The communication module 530 is a module for communicating with the outside. The communication module 530 can include a messaging module 531 such as messenger program, Short Message Service (SMS) and Multimedia Message Service (MMS) program, and Email program, and a telephony module 532 including a call info aggregator program module and VoIP module.

The presentation module 540 is a module for generating the display screen. The presentation module 540 includes a multimedia module 541 for playing and outputting multimedia content, and a UI & graphics module 542 for processing the UI and graphics. The multimedia module 541 can include a player module, a camcorder module, and a sound processing module. A multimedia module 541 plays various multimedia contents, and generates and plays the screen and the sound. The UI & graphics module 542 can include an image compositor module 542-1 for combining images, a coordinate combination module 542-2 for combining and generating coordinates on the screen for displaying the image, an X11 module 542-3 for receiving events from the hardware, and a 2D/3D UI toolkit 542-4 for providing a tool for creating the 2D or 3D UI. For example, the UI screen corresponding to the pointing mode or the gesture mode can be generated through the presentation module 540.

The web browser module 550 accesses a web server through web browsing. The web browser module 550 can include various modules such as web view module for creating the web page, a download agent module for downloading, a bookmark module, and webkit module.

The service module 560 indicates an application module for providing various services. For example, the service module 560 can include various modules such as navigation service module for providing map, current location, landmark, and route information, game module, and advertisement application module.

The main CPU 132 of the control unit 130 accesses the storage unit 140 through the storage interface 135, duplicates the various modules stored to the storage unit 140 to the RAM 131-2, and operates according to the operation of the duplicated module.

For example, when the GUI display corresponds to the pointing mode or the gesture mode, the main CPU 132 generates the GUI screen using the image combination module 542-1 of the presentation module 540. The main CPU 132 determines the display location of the GUI screen using the coordinate combination module 542-2 and controls the display unit 120 to display the GUI screen at the location.

When the user manipulation corresponds to the message reception, the main CPU 132 accesses a message management server and then receives a message stored to a user account by executing the messaging module 541. The main CPU 132 generates a screen corresponding to the received message using the presentation module 540 and displays the screen on the display unit 120.

As for a phone call operation, the main CPU 132 may drive the telephony module 532.

The storage unit 140 can store programs of diverse structures, and the control unit 130 can operate using the various programs stored to the storage unit 140 according to various embodiments of the present invention.

Figure 6:
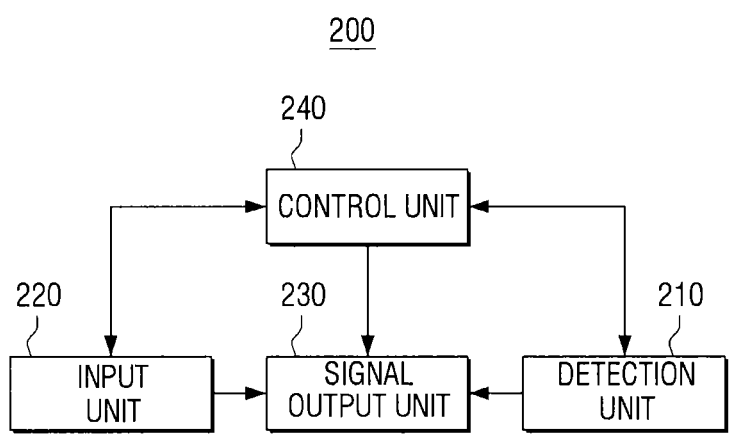
FIG. 6 illustrates a remote controlling apparatus according to an embodiment of the present invention.

FIG. 6 illustrates a remote controlling apparatus according to an embodiment of the present invention.

[An Exemplary Operation of a Remote Controlling Apparatus According to the First Exemplary Embodiment]

Referring to FIG. 6, the remote controlling apparatus 200 includes a detection unit 210, an input unit 220, a signal output unit 230, and a control unit 240.

The remote controlling apparatus 200 provides a remote controlling signal regarding the external display apparatus 100 which has a plurality of operation modes including the pointing mode and the gesture mode.

The detection unit 210 detects 3D motion of the remote controlling apparatus 200. The detection unit 210 can include at least one of an accelerometer, a gyro sensor, and a magnetometer. A combination of one or two or more sensors of the detection unit 210 can detect the 3D motion of the remote controlling apparatus 200. The 3D motion can be the rotation of the remote controlling apparatus 200.

The accelerometer measures spatial motion of the remote controlling apparatus 200. That is, the accelerometer can sense at least one of acceleration change or angular acceleration change when the user moves the remote controlling apparatus 200. The accelerometer can be implemented using a three-axis accelerometer for measuring the increase or decrease of the straight-line speed for three orthogonal axes. Information relating to the tilt can be obtained from the accelerometer using motion acceleration related information of the remote controlling apparatus 200 and a gravity acceleration component of the static state.

The gyro sensor is an inertial sensor for measuring the angular rotational velocity of the remote controlling apparatus 200, that is, a sensor for measuring the direction and the speed of the rotation using the inertial force of the rotating object. The gyro sensor can be implemented using a three-axis angular velocity sensor for measuring the increase or decrease of the rotation angle for three orthogonal axes.

The magnetometer is a sensor for measuring azimuth. That is, the magnetometer indicates the sensor for measuring the azimuth by detecting the magnetic field generated around the earth south and north. The magnetometer can be implemented using a three-axis magnetometer for measuring intensity and direction of the magnetism for three orthogonal axes. The north direction measured by the magnetometer can be the magnetic north. Even when the magnetometer measures the magnetic north, the true north may be output using internal calculations.

The detection unit 210 can further include a distance sensor optionally. the distance sensor measures the distance between the remote controlling apparatus 200 and the display apparatus 100. That is, the distance sensor can detect the distance between the user's usage location of the remote controlling apparatus 200 and the display apparatus 100.

The input unit 220 receives various user commands.

The input unit 220 may comprise a first button unit (not illustrated) which is used to receive a user command to select one of the pointing mode and the gesture mode in the operation mode of the display apparatus 100, and a second button unit (not illustrated) which is used to receive a user command to select an object displayed on the UI screen.

If the first button unit (not illustrated) is pressed, information regarding the operation mode may include information indicating that an external device is in the gesture mode, or if the pressed first button unit (not illustrated) is released, information regarding the operation mode may include information indicating that an external device is in the pointing mode.

For example, the mode information is information indicating the pointing mode or the gesture mode, and may be implemented in diverse forms. For example, the mode information may be implemented in a flag form. In the case of the pointing mode, the flag may indicate "0", or in the case of the gesture mode, the flag may indicate "1". That is, flag information indicating "0" or "1" can be generated according to whether the first button unit (not illustrated) is manipulated.

The signal output unit 340 outputs a remote controlling signal to the display apparatus 100.

The signal output unit 340 may transmit the information regarding the remote controlling apparatus 200 to the display apparatus 100 using various communication schemes such as BT, Zigbee, Wi-Fi, IR, Serial Interface, and USB.

The signal output unit 340 may output to the display apparatus 100 a signal corresponding to various user commands input through an input unit 220.

The control unit 240 controls overall operations of the remote controlling apparatus 200. For example, the controller 240 may be a Central Processing Unit (CPU) or a Microcontroller Unit (MCU).

The controller 240 may control the operations of the detection unit 210, the input unit 220, and the signal output unit 230.

If a user command is input through the above-described first button unit (not illustrated), the control unit 240 may control the signal output unit 230 to output information regarding a user command to select one of the pointing mode and the gesture mode and information regarding the detected motion.

The control unit may control the signal output unit 230 to output information regarding a user command to select one of the pointing mode and the gesture mode consecutively while the first button unit (not illustrated) is pressed and not to output information regarding a user command to select one of the pointing mode and the gesture mode while pressing on the first button unit (not illustrated) is released.

The external display apparatus 100 may maintain the pointing mode as default during a period where information regarding a user command to select one of the pointing mode and the gesture mode is not received from the remote controlling apparatus 200.

The external display apparatus 100 may convert the operation mode to the gesture mode as a non-default mode and maintain the converted mode during a period where information regarding a user command to select one of the pointing mode and the gesture mode is received from the remote controlling apparatus 200 continuously.

[An Exemplary Operation of the Remote Controlling Apparatus According to the Second Exemplary Embodiment]

Since the operation of the detection unit 210, the input unit 220, and the signal output unit 230 in the second exemplary embodiment is similar to that in the first exemplary embodiment, detailed description thereof is not repeated.

Information regarding a user command to select one of the pointing mode and the gesture mode that is input through the input unit 220 may be used to generate a control signal inside the remote controlling apparatus 200 instead of being not transmitted to the display apparatus 100. Accordingly, information regarding a user command to select one of the pointing mode and the gesture mode which is input through the input unit 220, that is, the information regarding the operation mode may not be implemented in the flag form unlike the first exemplary embodiment, but may be implemented in diverse forms capable of identifying input of a user command to change the mode. The information regarding the operation mode may be implemented in the flag form as in the first exemplary embodiment.

Figure 7:
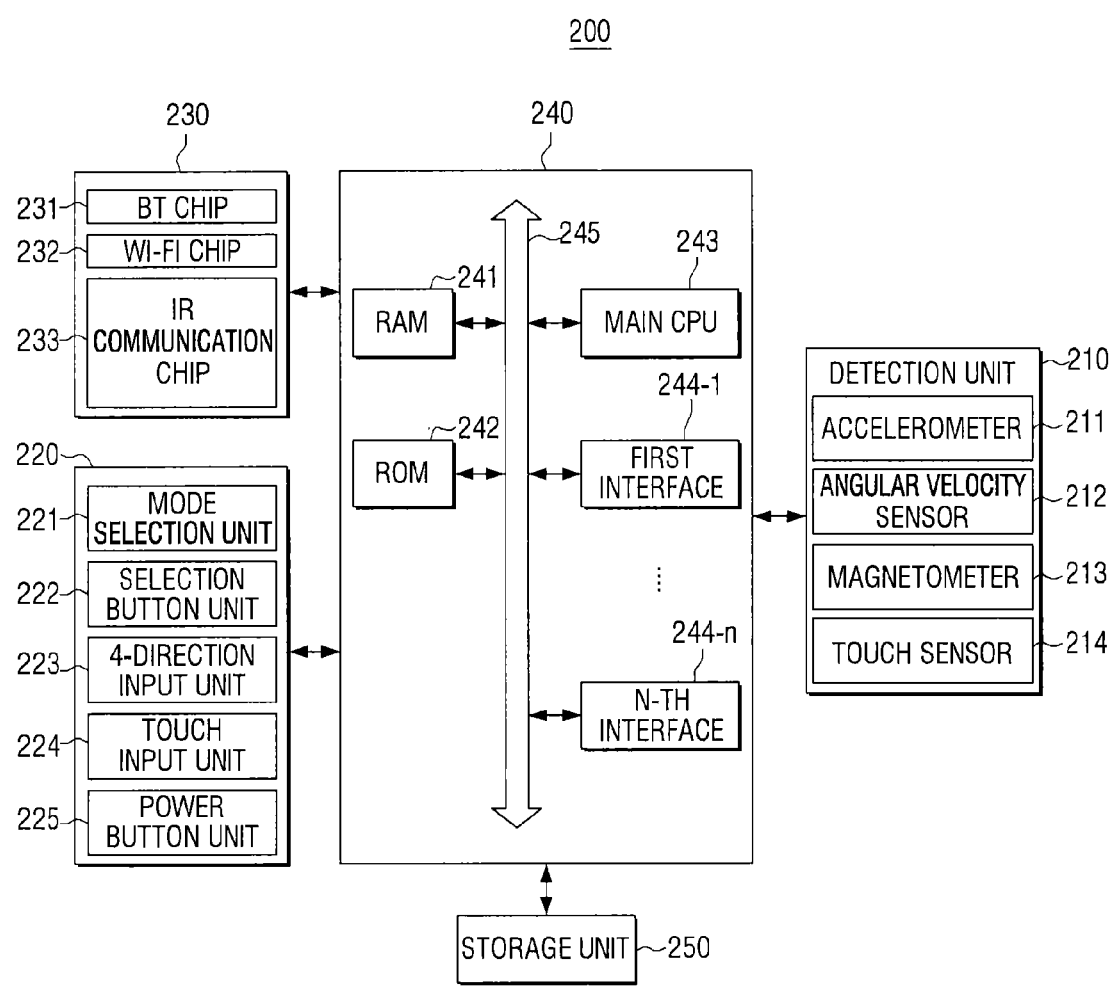
FIG. 7 illustrates the remote controlling apparatus.

The remote controlling apparatus 200 may generate a control signal to control the display apparatus 100 using information regarding a user command to select one of the pointing mode and the gesture mode which is input through the input unit 220 and motion information detected through the detection unit 210. FIG. 7 illustrates an exemplary configuration.

The control unit 240 may generate a control signal to control the external display apparatus 100 by analyzing corresponding information through a predefined signal processing algorithm.

For example, the control unit 240 may control the signal output unit 230 to analyze motion information through a gesture recognition algorithm based on information regarding a user command to select a gesture mode and output a control signal corresponding to the analyzed gesture to the display apparatus 100.

The control unit 240 may control the motion state of a pointing object by analyzing motion information through a signal processing algorithm based on information regarding a user command to select the pointing mode, calculating an absolute coordinates value to control the position of the pointing object, and transmitting the calculated absolute coordinates value to the display apparatus 100.

If a selection button unit 222 is selected, the control unit 240 may transmit a corresponding signal to the display apparatus 100 so that an item where the pointing object is located at the time when the selection button unit 222 is selected can be selected in the display apparatus 100. That is, in the second exemplary embodiment, the remote controlling apparatus 200 may generate a control signal to control the display apparatus 100 by converting motion information detected through the detection unit 210 to comply with the corresponding mode based on information regarding a user command to select one of the pointing mode and the gesture mode. Accordingly, the remote controlling apparatus 200 operates in a pointing control mode or in a gesture control mode, unlike the first exemplary embodiment.

FIG. 7 illustrates an exemplary remote controlling apparatus.

The detection unit 210 is a component for sensing the motion of the remote controlling apparatus 200. The detection unit 210 can include various sensors of an accelerometer 211, an angular velocity sensor 212, a magnetometer 213, and a touch sensor 214.

The accelerometer 211 measures the acceleration and the acceleration direction when the motion occurs. The accelerometer 211 outputs the sensing value corresponding to the motion acceleration of the remote controlling apparatus 200 to which the sensor is attached, and the sensing value corresponding to the gravity acceleration varying according to the tilt. Based on the output value of the accelerometer 211, the control unit 260 can determine the tilt using the motion acceleration of the remote controlling apparatus 200 and the gravity acceleration component of the motionless state.

When the rotary motion occurs, the angular velocity sensor 212 detects the angular velocity by measuring Coriolis force acting in the velocity direction. The control unit 260 can detect the rotation of the remote controlling apparatus 200 using the measurement value of the angular velocity sensor 212.

The magnetometer 213 detects the magnetism of the earth or the magnetic object using a 2-axis or 3-axis fluxgate. The control unit 260 can measure the direction and the strength of the magnetism using the magnetic value detected by the magnetometer 213, and calculate the azimuth based on the measurement. The control unit 240 can determine which direction the remote controlling apparatus 200 rotates in.

The touch sensor 214 can detect the user's touch. The touch sensor 214 can adopt a capacitive type or a resistive type. When a body part of the user touches the surface of the remote controlling apparatus 200, the capacitive touch sensor detects the electricity excited to the user body and calculates the touch coordinates using a dielectric coated on the surface of the remote controlling apparatus 200. The resistive touch sensor includes two electrode plates embedded in the remote controlling apparatus 200. When the user touches, the resistive touch sensor detects the current flow of the upper and lower plates contacted at the touched point and calculates the touch coordinates. Besides, IR detection type, surface acoustic wave type, integral stain gauge type, and piezo electric type can be used to detect the touch, and their detailed descriptions are omitted here.

The input unit 220 receives diverse user commands.

The input unit 220 may include a mode change button unit 221, a selection button unit 222, a 4-direction input unit 223, a touch input unit 224, and a power button unit 225.

The mode change button unit 221 may receive a user command to select one of the pointing mode and the gesture mode. The configuration of the mode change button unit 221 is disclosed.

The selection button unit 222 may receive a selection command.

The selection button unit 222 can receive a user command for selecting an item where the pointing object displayed on the screen of the display apparatus 100 is located in the pointing mode. When the selection button unit 251 is pressed while the pointing object displayed on the screen of the display apparatus 100 is positioned on a particular item, the corresponding object can be selected to execute the corresponding function. For example, when the corresponding content is an icon interface of a specific application, the corresponding application execution screen can be displayed.

The selection button unit 222 can function as an enter key or an OK key according to characteristics of the provided UI screen.

The 4-direction input unit 223 may be disposed in an outer frame of the selection button unit 222, and receives the user command for 4-direction manipulation.

The selection button unit 222 and the 4-direction input unit 223 can include at least one of a touch sensor and an Optical Joystick (OJ) adopting optical technology.

The touch input unit 224 can include a plurality of touch regions mapped to different functions. The touch input unit 224 can include the plurality of touch regions mapped to different functions such as channel change function, volume control function, and menu function.

The power button unit 225 receives the user command for the power ON/OFF.

The remote controlling apparatus 200 may include a centering button unit (not illustrated) for mapping a reference state of the remote controlling apparatus 200 and the pointing object display location when the power ON is input to the power button unit 225. Alternatively, the various buttons as aforementioned may function as the centering button unit (not illustrated). For example, when the remote controlling apparatus 200 is turned on, the remote controlling apparatus 200 can pair with the display apparatus 100. When the pairing is completed and the user presses the centering button unit (not illustrated), the pointing object can be displayed at the center of the display screen of the display apparatus 100 and the current state of the remote controlling apparatus 200 can be matched to the position of the pointing object displayed at the center of the display screen. The reference point is at a center of the screen, by way of example, and the reference point may be set to another position on the display screen.

Operations of the control unit 240 can be executed by the program stored to the storage unit (250).

The storage unit (250) can store various data such as O/S software for driving the remote controlling apparatus 200, and signal processing algorithm (as in the second exemplary embodiment) for processing the detection signal detected by the detection unit 210. Using the various programs stored to the storage unit 250), the control unit 240 controls the operations of the remote controlling apparatus 200.

The control unit 240 includes a RAM 241, a ROM 242, a main CPU 243, first through n-th interfaces 244-1 through 244-n, and a bus 245.

The RAM 241, the ROM 242, the main CPU 243, and the first through n-th interfaces 244-1 through 244-n can be connected via the bus 245 to transmit and receive various data and signals.

The first through n-th interfaces 244-1 through 244-n may be connected to, not only the components illustrated in FIG. 7, but also the other components for access of the main CPU 243.

The main CPU 243 accesses the storage unit (250) and performs the booting using the O/S stored to the storage unit (250). The main CPU 243 performs various operations using the various programs and data stored to the storage unit (250).

The ROM 424 stores an instruction set for the system booting. When the turn-on command is input and the power is supplied, the main CPU 243 copies the O/S stored to the storage unit (250), to the RAM 241 according to the instruction stored to the ROM 242, and boots up the system by executing the O/S. When the booting is completed, the main CPU 243 copies the various programs stored to the storage unit (250), to the RAM 241, and performs various operations by executing the program copied to the RAM 241.

The control unit 240 can perform various operations by copying and executing the program stored to the storage unit (250), to the RAM 241.

Figure 8:
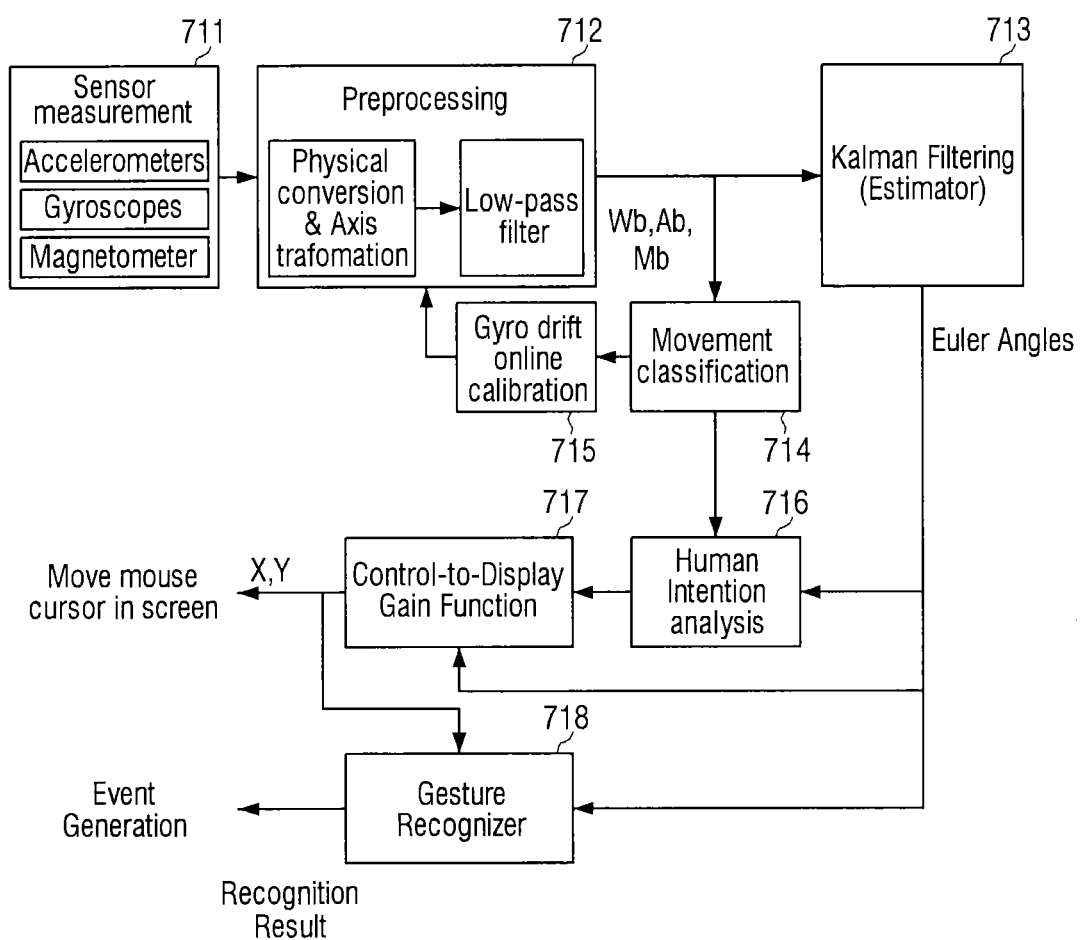
FIG. 8 illustrates a signal processing algorithm according to an embodiment of the present invention.

FIG. 8 illustrates a signal processing algorithm according to an embodiment of the present invention.

As illustrated in FIG. 8, the signal processing algorithm includes a first block 711 for receiving the sensor measurement value, a second preprocessing block 712, a third pose estimation block 713, a fourth movement classification block 714, a fifth calibration block 715, a sixth user intention analysis block 716, a seventh gain function application block 717, and an eighth gesture recognition block 718. The signal processing algorithm of FIG. 7 can be performed by the CPU or the MCU.

The first block 711 receives the various sensor values from the detection unit 220. For example, the first block 711 can receive the sensor value sensed by at least one of the accelerometer, the gyro sensor, and the magnetometer.

The second block 712 preprocesses the received sensor value. The second block 712 performs physical quantity conversion, sensor axis transformation, and low pass filtering for the sensor value.

For example, the sensor value converted to a digital value is converted to the actual physical quantity (the physical quantity conversion) applicable to the signal processing algorithm. Axes of the accelerometer, the angular velocity sensor, and the magnetometer can be set to one defined axis (the sensor axis transformation). The low pass filtering can remove electrical noise and unintended high frequency of the sensor (the low pass filtering).

The third block 713 estimates a pose or a pose angle (Euler angles (roll, pitch, yaw (heading)) from each sensor value. Estimation using Kalman filter can be applied.

The fourth block 714 classifies the movement state using the sensor signal, and can determine whether the remote controlling apparatus 200 does not move, moves slowly, or moves fast.

The fifth block 715 performs calibration. When the fourth block 714 determines that the remote controlling apparatus 200 does not move, that is, determine zero rate, the fifth block 715 can calculate an average of the output values of the angular velocity sensor, subtract the average from the output value of the angular velocity sensor, and thus compensate for an offset value of the angular velocity sensor.

The sixth block 716 analyzes and determines whether the user intends to move, stop, or click the remote controlling apparatus 200.

The seventh block 717 converts the yaw angle and the pitch angle output from the third block 713 to X and Y coordinates of the display apparatus 100. Using the converted coordinates, the location of the mouse cursor can be set.

The eighth block 718 may recognize the designated gesture using the signal output form the second block 712.

The coordinates of the pointing object can be set in the UI screen of the display apparatus 100 by mapping the X and Y coordinates output from the seventh block 717 to the X and Y coordinates of the pointing object.

Using the Euler angles (roll, pitch, yaw) output from the eighth block 718 or the X and Y coordinates output from the seventh block 717, a preset event can be generated in the UI screen to perform the corresponding operation.

The calculations according to the signal processing algorithm can be processed by the control unit 260 of the remote controlling apparatus 200 or the control unit 130 of the display apparatus 100.

Figure 9A:
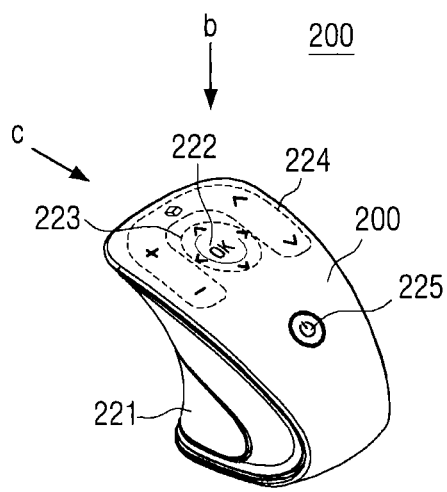
FIGS. 9A, 9B, and 9C illustrate an exemplary exterior of a remote controlling apparatus.
Figure 9B:
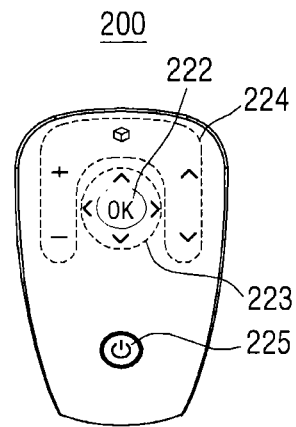
Figure 9C:
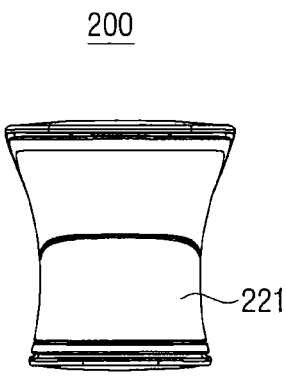
Figure 10:
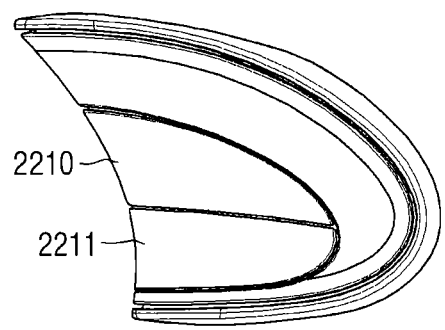
FIG. 10 illustrates a plurality of mode change button units of the remote controlling apparatus.

FIGS. 9A, 9B, and 9C illustrate an exemplary exterior of a remote controlling apparatus 200. FIG. 9A is a perspective view of the remote controlling apparatus 200, FIG. 9B is a view taken in the direction b of FIG. 9A, and FIG. 9C is a view taken in the direction c of FIG. 9A. FIG. 10 illustrates of a plurality of mode change button units 231 of the remote controlling apparatus 200.

Referring to FIG. 9A, the upper front part of the remote controlling apparatus 200 may protrude more than the lower front part and the top side gradually inclines backwards with a small curvature by considering the pose of the hand naturally cupping so as to minimize fatigue of the hand in the usage.

The front side and the left/right sides of the remote controlling apparatus 200 may be rounded concavely to enhance grip as illustrated in FIG. 9C. Hence, the user can comfortably hold and use the remote controlling apparatus 200 with the hand without causing strain to the hand or the whist.

When the user holds the remote controlling apparatus 200 with the hand, the mode change button unit 231 can be disposed in the front side or the front side and either side of the remote controlling apparatus 200 where the middle finger F2 and the ring finger F3 of the five fingers are placed, and the selection button unit 251 can be disposed in the top side or the top front side of the remote controlling apparatus 200 where the thumb F1 is placed (FIG. 11).

The disposition of the mode change button unit 221 and the selection button unit 222 can be set by considering the locations of the fingers F1 through F3 for naturally pressing the mode change button unit 221 and the selection button unit 222 while holding the remote controlling apparatus 200 with the hand.

While the single mode change button unit 221 may be formed by way of example, a remote controlling apparatus 2000 can include a plurality of mode change button units 2210 and 2211 as illustrated in FIG. 10. The mode change button units 2210 and 2211 may be placed in an up and down configuration so that the middle finger and the ring finger of the five fingers can manipulate the mode change button units 2210 and 2211.

When a plurality of the mode change button units 2210 and 2211 is provided, the mode change button units 2210 and 2211 may be manipulated alone or together to generate different signals.

The 4-direction input unit 223 and the touch input unit 224 can be formed on the top side of the remote controlling apparatus 200. The 4-direction input unit 223 can surround the selection button unit 222 and the touch input unit 224 can surround the selection button unit 222. That is, the selection button unit 222 may be disposed in the innermost part and the range expands outwards from the selection button unit 222 to place the 4-direction input unit 223 and the touch input unit 224.

The disposition of the 4-direction input unit 223 and the touch input unit 224 facilitates easy manipulation with the thumb which can relatively freely move among the five fingers while gripping the remote controlling apparatus 200.

The touch input unit 224 can include a channel control region on the right, a volume control region on the left, and a plurality of touch regions mapped to different functions such as menu region on the upper side as illustrated in FIG. 9B.

The power button unit 225 can be disposed in the upper rear side of the remote controlling apparatus 200 to block the relatively easy access of the finger, compared to the button units as stated above. The disposition of the power button unit 225 can minimize the turning of power off if the power button unit 225 is pressed by mistake in use of the remote controlling apparatus 200.

While the usage of the remote controlling apparatus 200 is explained based on, but not limited to, the user who can use all of the five fingers, the user can manipulate the button units of the remote controlling apparatus 200 with a most suitable finger or number of fingers.

FIGS. 11A-11C illustrate exemplary manipulation of a remote controlling apparatus according to various embodiments of the present invention.

As illustrated in FIG. 11A, the user can select the pointing mode of the display apparatus 100 by releasing the pressed mode change button unit 221. As such, when the display apparatus 100 is in the pointing mode, the UI screen provided by the display apparatus 100 can display the pointing-type pointer.

The user can select the gesture mode of the display apparatus 100 by keeping pressing the mode change button unit 221 as illustrated in FIG. 11B. When the display apparatus 100 is in the gesture mode, the UI screen provided by the display apparatus 100 can display the palm-type pointer.

The flicking and the zoom in/out can be controlled through the gesture of the remote controlling apparatus 200 in the corresponding UI screen. For example, the flicking for switching the displayed UI screen to the different UI screen, the flicking for displaying a new menu screen, and the zoom in/out for zooming in and out the displayed content are possible.

The display apparatus 100 can operate basically in the pointing mode, and in the gesture mode if there is the grip which keeps pressing the mode change button unit 221.

As illustrated in FIG. 11C, the user can control the panning by keep pressing the mode change button unit 221 and the selection button unit 222. In this case, the UI screen provided from the display apparatus 100 can display the grip-type pointer. For example, when the remote controlling apparatus 200 is rotated in a particular direction, the content image enlarged and displayed on the screen can be moved in the corresponding direction. That is, when a particular content is selected and the remote controlling apparatus 200 is rotated vertically and horizontally, the displayed content image can move in the direction corresponding to the rotation direction of the remote controlling apparatus 200. Hence, the grip-type pointer can provide the user with intuitive cognition like holding the content.

FIG. 12 illustrates operations in the pointing mode according to an embodiment of the present invention.

As illustrated in FIG. 12, when the display apparatus 100 is in the pointing mode, the display apparatus 100 can display the GUI corresponding to the pointing mode. That is, the hand-shaped pointer 10 of the pointing type can be displayed on the screen.

When the pointing-type pointer is put on a content A 121 and the user rotates the remote controlling apparatus 200 to the right, the pointing-type pointer 10 displayed on the screen can move to a content B 122 on the right of the content A 121.

The pointing-type pointer 10 displayed on the screen can move according to the rotation direction and the rotation degree of the remote controlling apparatus 200 based on the absolute coordinate scheme. The absolute coordinate scheme moves the pointer in an absolute coordinate region and the pointer displayed on the screen moves based on a preset reference value, which is different from the relative coordinate scheme for moving the pointer based on the previous pointer location.

Figure 13:
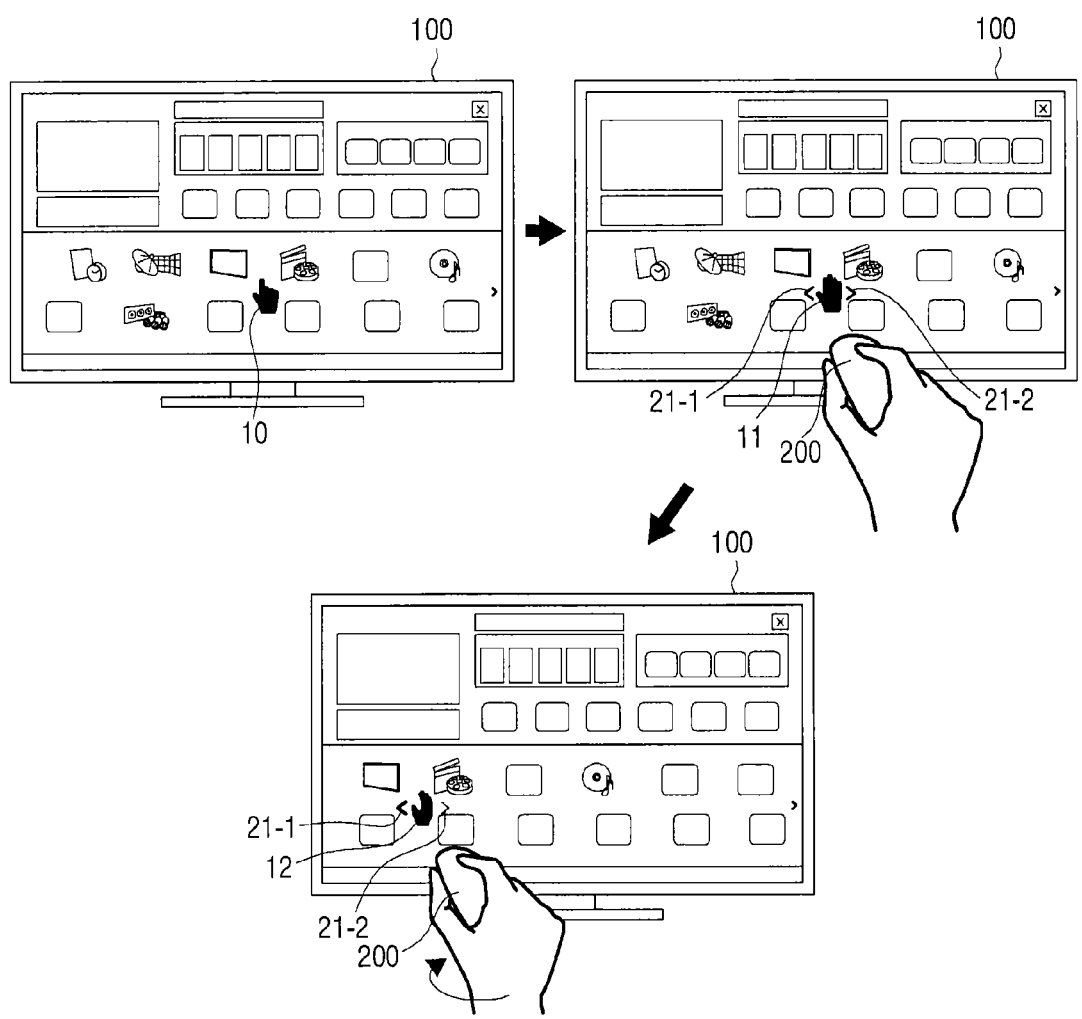
FIG. 13 illustrates operations in the mode change according to an embodiment of the present invention.

FIG. 13 illustrates operations in the mode change according to an embodiment of the present invention.

When the display apparatus 100 is in the pointing mode as illustrated in the first drawing of FIG. 13, the screen of the display apparatus 100 can display the pointing-type pointer 10 indicating the pointing mode.

When the display apparatus 100 is switched to the gesture mode, the pointer 10 displayed on the screen of the display apparatus 100 is changed to the palm-type pointer 11 indicating the gesture mode and guide GUIs 21-1 and 21-2 guiding the gesture input direction can be displayed. For example, when new system UI pages are arranged on the left and the right as illustrated in the drawing, the guide GUIs 21-1 and 21-2 of the left and right arrows indicating the left and right flicking gestures can be displayed.

When the remote controlling apparatus 200 is rotated to the left, the palm-type pointer 11 is changed to and displayed as a pointer 12 of the altered angle in the same manner as the actual left flicking hand of the user and the guide GUI 21-1 guiding the left direction can be highlighted and displayed. For example, when the flicking is applied onto the touch screen, the hand angle of the user is generally changed. Similarly, the type of the pointer can be changed and displayed in the same fashion. Thus, the intuitive cognition like flicking on the touch screen can be provided to the user.

The movement direction of the UI screen displayed on the screen can be controlled according to the rotation direction of the remote controlling apparatus 200. For example, when the remote controlling apparatus 200 is rotated to the left as illustrated in the drawing, the UI screen can be moved to the left and displayed. That is, contents displayed in the center are moved to the left and the unseen contents on the right can be displayed.

Figure 14:
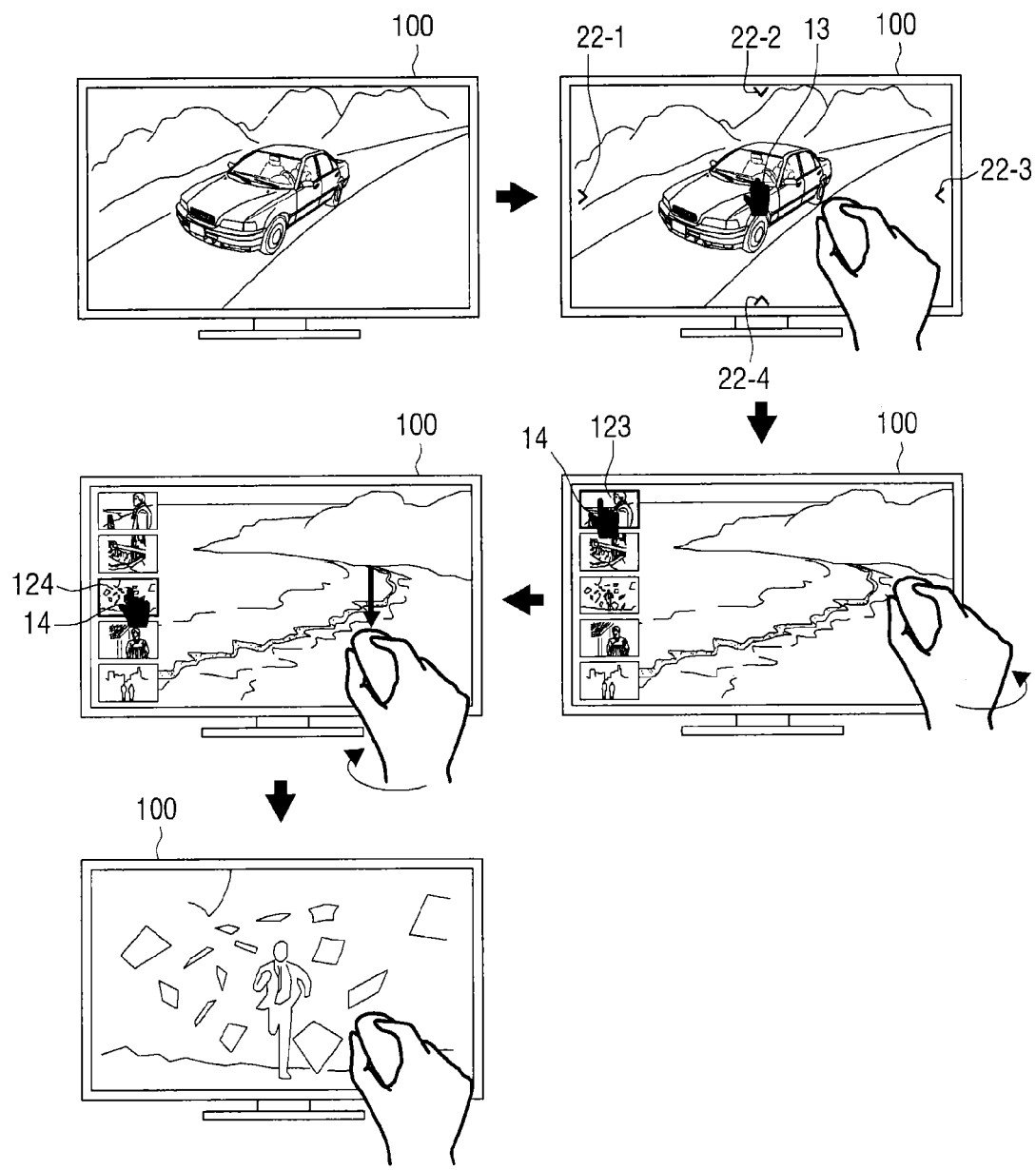
FIG. 14 illustrates operations in a gesture mode according to one embodiment of the present invention.

FIG. 14 illustrates operations in the gesture mode according to an embodiment of the present invention.

As illustrated in FIG. 14, when a particular content is displayed on the screen and the user presses the first button unit (e.g., the mode change button unit 221 of FIG. 4B) of the remote controlling apparatus 200, the display apparatus 100 operates in the gesture mode and displays guide GUIs 22-1 through 22-4 guiding the available gesture inputs on the screen.

When the user rotates the remote controlling apparatus 200 in a particular direction while pressing the mode change button unit 221, a preset menu can be displayed in the region corresponding to the rotation direction. For example, when the remote controlling apparatus 200 is rotated to the right as illustrated in the drawing, a content list can be displayed on the left.

When the user releases the pressed mode change button, the display apparatus 100 operates in the pointing mode. In this case, the pointing-type pointer 14 can move according to the rotation of the remote controlling apparatus 200. For example, the pointing-type pointer 14 is positioned on a particular content C 123 and the user rotates the remote controlling apparatus 200 downwards, the pointing-type pointer 14 can move to a content D 124 below according to the rotation degree.

When the pointing-type pointer 14 is positioned on the content D 124 and the user presses the selection button of the remote controlling apparatus 200, the selected content D 124 is executed and displayed on the screen.

Figure 15:
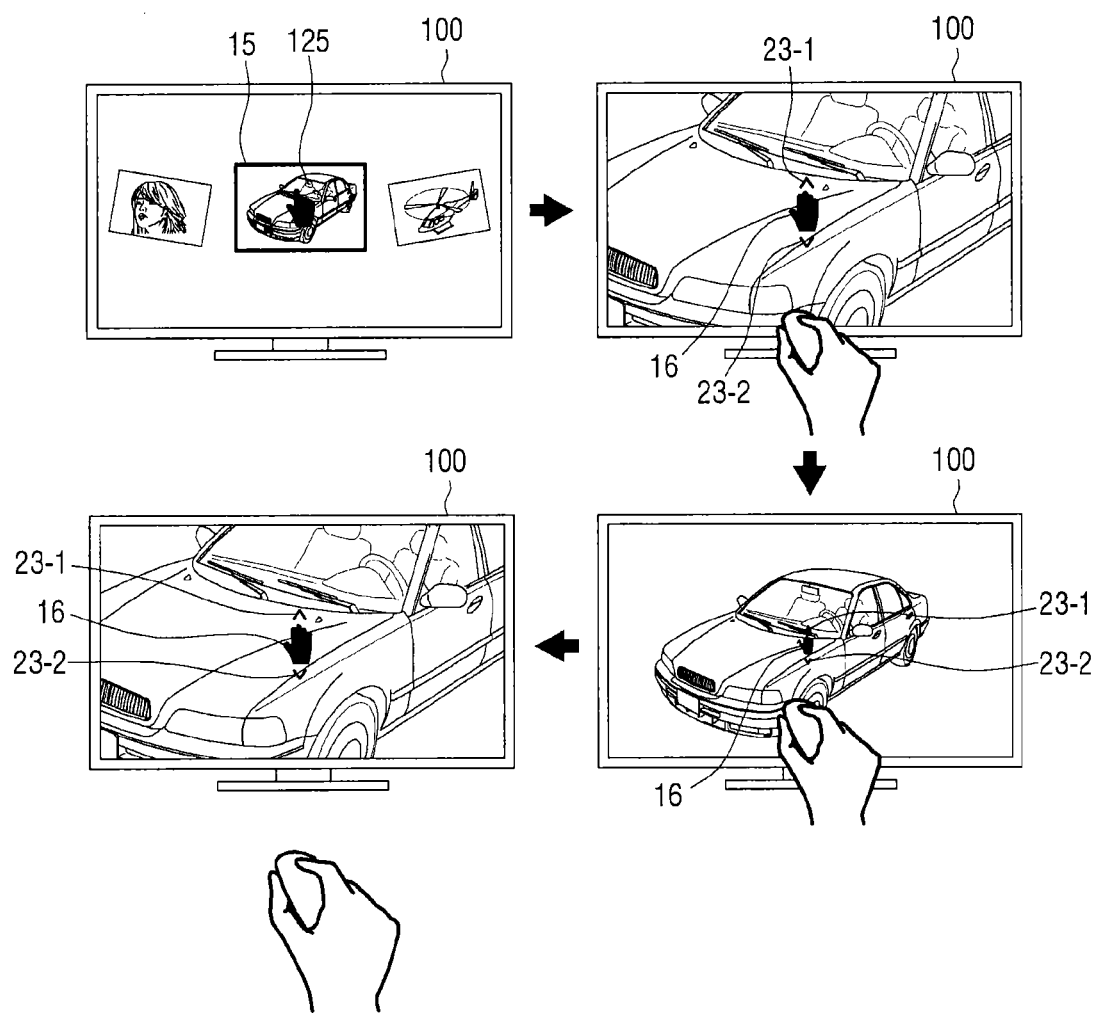
FIG. 15 illustrates operations in the gesture mode according to another embodiment of the present invention.

FIG. 15 illustrates operations in the gesture mode according to an embodiment of the present invention.

As illustrated in FIG. 15, when a pointing-type pointer 15 is positioned on a content E 125 in the pointing mode and the user presses the selection button (e.g., the selection button unit 232 of FIG. 9B) of the remote controlling apparatus 200, the selected content E 125 is displayed on the screen of the display apparatus 100.

When the user presses the mode change button (e.g., the mode change button unit 221 of FIG. 9B) of the remote controlling apparatus 200, a pointing-type pointer 15 displayed on the screen is changed to a palm-type pointer 16 indicating the gesture mode and guide GUIs 23-1 and 23-2 guiding the available gesture inputs can be displayed.

When the user moves the remote controlling apparatus 200 away from the user while pressing the mode change button, the content displayed on the screen can be zoomed out and displayed. The movement away from the user can rotate the remote controlling apparatus 200 toward the display apparatus 100.

When the user moves the remote controlling apparatus 200 closer to the user while pressing the mode change button, the content displayed on the screen can be zoomed in and displayed. The movement closer to the user can rotate the remote controlling apparatus 200 away from the display apparatus 100.

Figure 16:
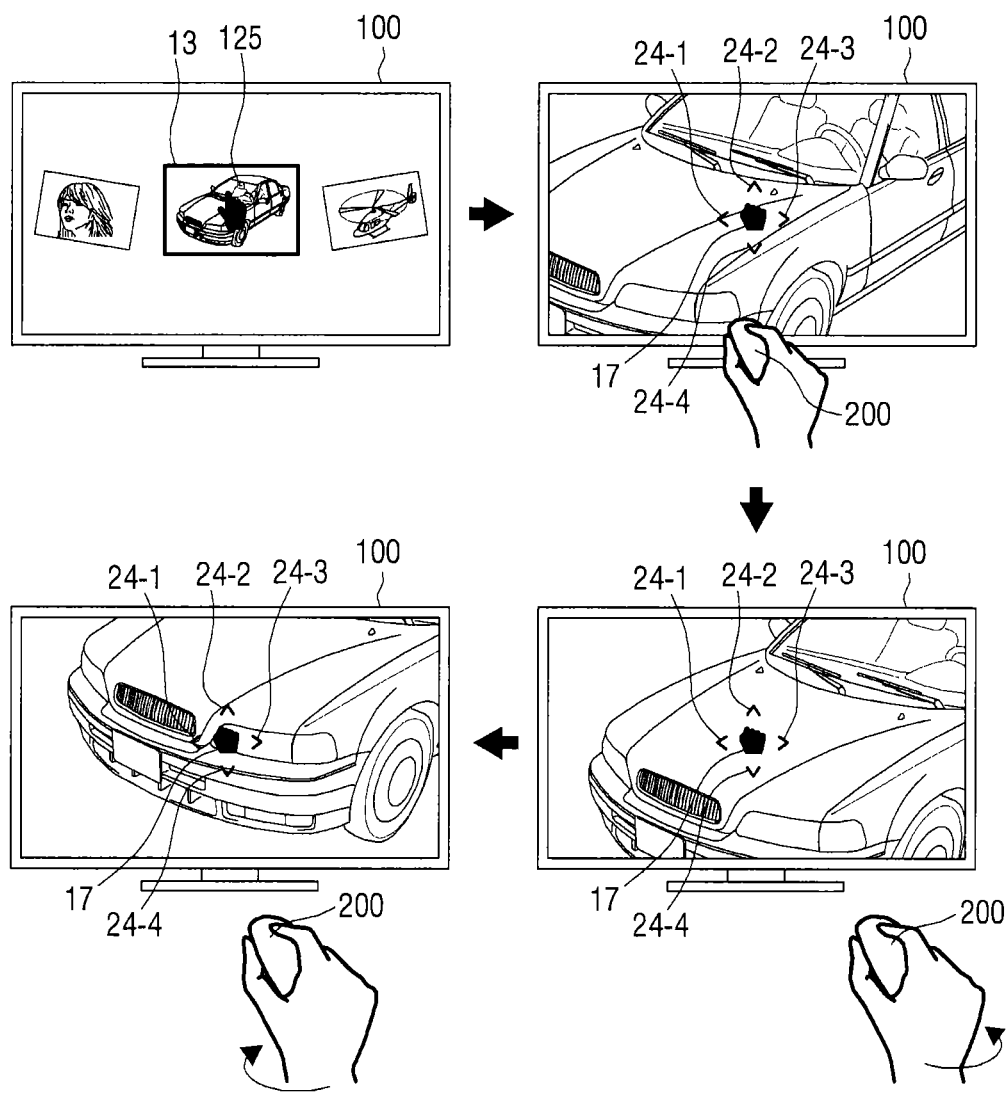
FIG. 16 illustrates operations in the gesture mode according to yet another embodiment of the present invention.

FIG. 16 illustrates operations in the gesture mode according to an embodiment of the present invention.

As illustrated in FIG. 16, when the pointing-type pointer 15 is placed on the content E 125 in the pointing mode and the user presses the second button unit (e.g., the selection button unit 222 of FIG. 9B) of the remote controlling apparatus 200, the selected content E 125 is displayed on the screen of the display apparatus 100.

When the user keeps pressing the selection button while pressing the mode change button (e.g., the mode change button unit 231 of FIG. 9B), the pointing-type pointer 15 is changed to a grip-type pointer 17 indicating the panning manipulation and guide GUIs 24-1 through 24-4 guiding the available gesture inputs can be displayed.

When the user rotates the remote controlling apparatus 200 vertically and horizontally while pressing the mode change button and the selection button, the content displayed on the screen can be panned. For example, when the user rotates the remote controlling apparatus 200 to the right while pressing the mode change button and the selection button, the content displayed on the screen can be moved to the right.

While the user applies the panning manipulation while pressing the mode change button and the selection button at the same time in this embodiment, the panning manipulation can be performed while pressing the selection button without pressing the mode change button.

Figure 17:
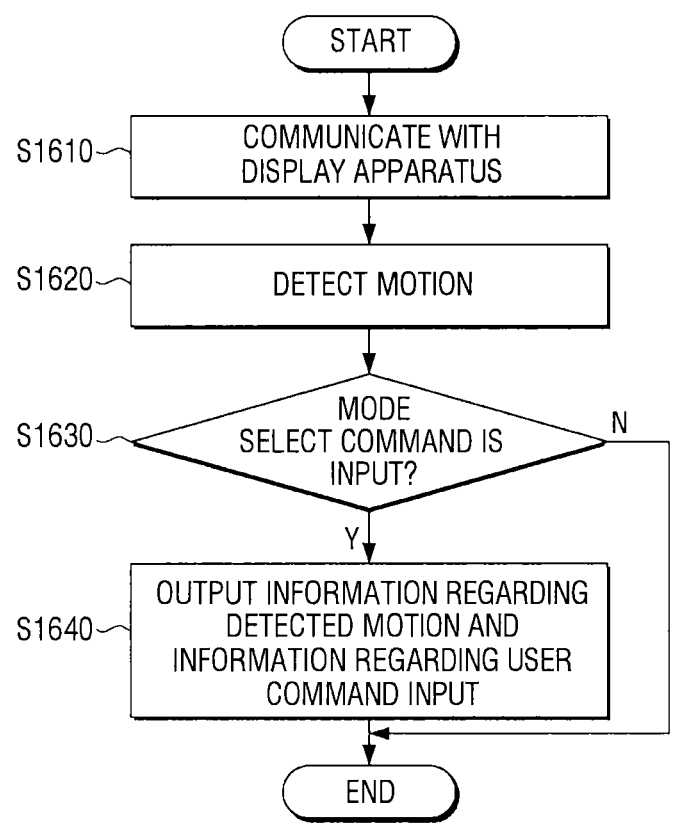
FIG. 17 illustrates a control method of a remote controlling apparatus according to an embodiment of the present invention.

FIG. 17 illustrates an exemplary control method of the remote controlling apparatus according to an embodiment of the present invention.

Referring to FIG. 17, the remote controlling apparatus 200 communicates with the display apparatus 100 (S1610). For example, when the remote controlling apparatus 200 communicates with the display apparatus 100 using the BT and the remote controlling apparatus 200 is turned on, the remote controlling apparatus 200 can discover and pair with the display apparatus 100.

After the pairing, the display apparatus 100 can operate in the pointing mode. When the user command is input through the remote controlling apparatus 200, the pointing object can be displayed on the screen of the display apparatus 100 and the displayed pointing object location can be mapped to the current state of the remote controlling apparatus 200.

The motion of the remote controlling apparatus 200 is detected (S1720).

If a user command to select one of the pointing mode and the gesture mode is input (S1730:Y), motion information detected in S1720 and information regarding a user command input in S1730 are output to the display apparatus 100 (S1740).

The pointing mode may be a mode to control the motion of a pointing object displayed on the UI screen of the display apparatus 100 according to the motion of the detected remote controlling apparatus, and the gesture mode may be a mode to control a display state of a UI screen according to the predefined gesture of the remote controlling apparatus 200.

In the pointing mode, the movement state of the pointing object displayed on the screen of the display apparatus 100 may be controlled according to the motion state of the remote controlling apparatus 200. The motion state can be the rotation state of the remote controlling apparatus 200.

In the gesture mode, the screen display state of the display apparatus 100 may be controlled according to a movement of the remote controlling apparatus 200. For example, the screen can be changed to the menu screen or other UI screen.

When the user command not for the mode change is input, the remote controlling apparatus 200 can send the control signal corresponding to the input command to the display apparatus 100. For example, when the content selection command or the pointing object movement command is input, the remote controlling apparatus 200 can send the corresponding control signal to the display apparatus 100.

Figure 18:
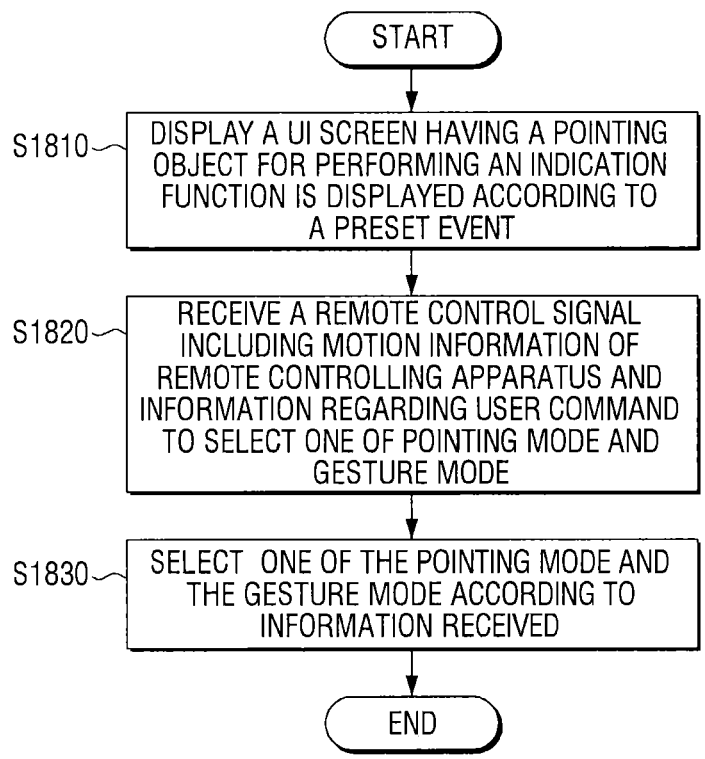
FIG. 18 illustrates a control method of the display apparatus according to an embodiment of the present invention.

FIG. 18 illustrates a control method of the display apparatus according to an embodiment of the present invention.

Referring to FIG. 18, the display apparatus 100 displays a UI screen having a pointing object for performing an indication function is displayed according to a preset event (S1810). The preset event may be an event in which the display apparatus 200 is connected to the remote controlling apparatus 200, or an event in which a predetermined button of the connected remote controlling apparatus 200 is pressed.

A remote control signal including motion information of the remote controlling apparatus and information regarding a user command to select one of the pointing mode and the gesture mode is received from the remote controlling apparatus 200 (S1820).

One of the pointing mode and the gesture mode is selected according to the information regarding a user command to select one of the pointing mode and the gesture mode which is received from the remote controlling apparatus 200 and the display apparatus 100 is operated accordingly (S1830).

The display apparatus 100 can display the hand-shaped pointing-type pointer on the UI screen and operates in the pointing mode when receiving information regarding a user command to select the pointing mode from the remote controlling apparatus 200, and display the hand-shaped pointer of the palm type and operates in the gesture mode when receiving information regarding a user command to select the gesture mode from the remote controlling apparatus 200.

When the flicking manipulation is input through the remote controlling apparatus 200 in the gesture mode, the display apparatus 100 can display the hand-shaped pointer corresponding to the flicking hand gesture.

When the panning manipulation is possible in the gesture mode, the display apparatus 100 can change and display the hand-shaped pointer to the grip type. The hand-shaped pointers are disclosed herein.

The display apparatus 100 can display the guide GUI for guiding the gesture input in the gesture mode.

For example, when the flicking manipulation is possible, the guide GUI of the left and right arrows for guiding the left and right gesture inputs can be displayed. When the zoom in/out is possible, the guide GUI of the up and down arrows for guiding the up and down gesture inputs can be displayed. When the panning manipulation is possible, the guide GUI of the up, down, left, and right arrows for guiding the up, down, left, and right gesture inputs can be displayed.

According to various embodiments of the present invention, the intuitive remote control method can be provided to the user.

Methods according to various embodiments of the present invention can be realized by upgrading software of the existing display device or the user terminal.

A non-transitory computer readable medium can store a program for sequentially carrying out the present control methods.

The non-transitory computer readable medium indicates a medium for storing data semi-permanently and allowing reading of the device, rather than a medium for storing data for a short term such as register, cache, and memory. The various application and programs as stated above can be stored to and provided by the non-transitory computer readable medium such as CD, DVD, hard disc, Blue Ray disc, USB, memory card, and ROM.

While the bus is depicted in the block diagrams of the display apparatus and the remote controlling apparatus, the communication between the components of the display apparatus and the remote controlling apparatus can be performed via the bus. Each apparatus may include a processor such as CPU and microprocessor for conducting the aforementioned operations, for example.

Although a few embodiments of the present invention have been illustrated and described, it would be appreciated by those skilled in the art that changes may be made in these embodiments without departing from the principles and spirit of the invention, the scope of which is defined in the claims and their equivalents.

What is claimed is:

1. A display system comprising:
    a remote controlling apparatus configured to control a selection of an operation mode based on a user command; and
    a display apparatus configured to communicate with the remote controlling apparatus and to display a user interface screen having a pointing object, and to have a pointing operation mode for controlling a movement of the pointing object displayed on the user interface screen according to a motion of the remote controlling apparatus and a gesture operation mode, for controlling the display apparatus according to a predefined gesture of the remote controlling apparatus, which are controlled by the remote controlling apparatus,
    wherein the remote controlling apparatus causes the user interface screen to display one of a plurality of different guide graphical user interfaces that surround the pointing object, each of the plurality of different guide graphical user interfaces corresponds to one a plurality of manipulations and indicates a direction to perform the predefined gesture of the remote controlling apparatus when in a gesture mode, and
    wherein the pointing object changes to one of a plurality of different shapes response to predetermined movements of the remote controlling apparatus in order to perform one of the plurality of manipulations.

2. The display system of claim 1, wherein, during a time interval in which information regarding the selecting one of the pointing operation mode and the gesture operation mode is not received from the remote controlling apparatus, the display apparatus is configured to remain in the pointing operation mode as a default mode, and
    during a time interval in which information regarding the selecting one of the pointing operation mode and the gesture operation mode is continuously received from the remote controlling apparatus, the display apparatus is configured to transition and remain in the gesture operation mode as a non-default mode.

3. The display system of claim 2, wherein the remote controlling apparatus:
    is configured to control output the information regarding the selecting of one of the pointing operation mode and the gesture operation mode continuously while a first button unit is being pressed, and not to output the information regarding the selecting of one of the pointing operation mode and the gesture operation mode when the pressed first button unit is released.

4. The display system of claim 1, wherein a first pointing object is displayed in response to a flicking movement of the remote controlling apparatus, a second pointing object is displayed in response to a forward and a backward movement of the remote controlling apparatus, and
    a third pointing object is displayed in response to a panning movement of the remote controlling apparatus.

5. The display system of claim 4, wherein the displayed first pointing object is changed in both displayed shape and movement in response to the flicking movement of the remote controlling apparatus.

6. The display system of claim 4, wherein the displayed second pointing object is changed in size in response to the forward and the backward movement of the remote controlling apparatus.

7. The display system of claim 1, wherein, when in the gesture mode, the user interface screen is configured to change a display of menu screen or UI page.

8. The display system of claim 1, wherein, when in the gesture mode, the user interface screen is configured to change a displayed content.

9. The display system of claim 1, wherein at least one of the changes to one of a plurality of different shapes graphically illustrates a change in hand angle of a user of the remote controlling apparatus.

10. A remote controlling apparatus for a display apparatus, the remote controlling apparatus comprising:
- a control unit configured to control a selection of a pointing mode, for controlling a movement of a pointing object displayed on a user interface screen of the display apparatus according to a motion of the remote controlling apparatus, and a gesture mode, for changing a display screen according to a predefined gesture of the remote controlling apparatus, based on an user input,
- an output unit configured to output information regarding the user selection of one of the pointing mode and the gesture mode,
- wherein the control unit causes the display screen to display one of a plurality of different guide graphical user interfaces that surround the pointing object, each of the plurality of different guide graphical user interfaces corresponds to one a plurality of manipulations and indicates a direction to perform the predefined gesture of the remote controlling apparatus when in a gesture, and
- wherein the pointing object changes to one of a plurality of different shapes in response to predetermined movements of the remote controlling apparatus in order to perform one of the plurality of manipulations.

11. The remote controlling apparatus of claim 10, wherein a first pointing object is displayed in response to a flicking movement of the remote controlling apparatus, a second pointing object is displayed in response to a forward and a backward movement of the remote controlling apparatus, and
- a third pointing object is displayed in response to a panning movement of the remote controlling apparatus.

12. The remote controlling apparatus of claim 11, wherein the displayed first pointing object is changed in both displayed shape and movement in response to the flicking movement of the remote controlling apparatus.

13. The remote controlling apparatus of claim 12, wherein the displayed second pointing object is changed in size in response to the forward and the backward movement of the remote controlling apparatus.

14. The remote controlling apparatus of claim 10, wherein, when in the gesture mode, the display screen is configured to change a display of menu screen or UI page.

15. The remote controlling apparatus of claim 10, wherein, when in the gesture mode, the display screen is configured to change a displayed content.

16. The remote controlling apparatus of claim 10, wherein the at least one of the changes to one of a plurality of different shapes graphically illustrates a change in hand angle of a user of the remote controlling apparatus.

17. A display apparatus comprising:
- a receiving unit configured to communicate with a remote controlling apparatus;
- a display unit configured to display a user interface screen having a pointing object;
- a control unit configured to operate in a pointing operation mode, for controlling a movement of the pointing object displayed on the user interface screen according to a motion of the remote controlling apparatus, and in a gesture operation mode, for controlling the display apparatus according to a predefined gesture of the remote controlling apparatus,
- wherein the control unit causes the display screen to display one of a plurality of different guide graphical user interfaces that surround the pointing object, each of the plurality of different guide graphical user interfaces corresponds to one a plurality of manipulations and indicates a direction to perform the predefined gesture of the remote controlling apparatus when in a gesture mode,
- wherein the pointing object changes to one of a plurality of different shapes in response to predetermined movements of the remote controlling apparatus in order to perform one of the plurality of manipulations.

* * * * *